United States Patent
Enver et al.

(10) Patent No.: US 7,761,171 B2
(45) Date of Patent: Jul. 20, 2010

(54) METHODS AND APPARATUS TO GENERATE SCHEDULES TO EXECUTE FUNCTIONS IN A PROCESS CONTROL SYSTEM

(75) Inventors: Alper Turhan Enver, Austin, TX (US); John Michael Lucas, Leicester (GB); Kenneth D. Krivoshein, Austin, TX (US); Ram Ramachandran, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 170 days.

(21) Appl. No.: 11/537,303

(22) Filed: Sep. 29, 2006

(65) Prior Publication Data

US 2008/0082193 A1    Apr. 3, 2008

(51) Int. Cl.
    *G05B 15/02* (2006.01)
(52) U.S. Cl. ............... 700/11; 700/19; 700/20
(58) Field of Classification Search ............... 700/9–12, 700/14, 19, 20, 23, 100–102; 705/9, 10
See application file for complete search history.

(56) References Cited

U.S. PATENT DOCUMENTS

| | | | | |
|---|---|---|---|---|
| 5,971,581 A | * | 10/1999 | Gretta et al. | 700/83 |
| 6,038,539 A | * | 3/2000 | Maruyama et al. | 705/8 |
| 6,076,952 A | * | 6/2000 | Gretta et al. | 700/83 |
| 6,285,966 B1 | | 9/2001 | Brown et al. | |
| 6,564,382 B2 | * | 5/2003 | Duquesnois et al. | 725/100 |
| 6,662,061 B1 | * | 12/2003 | Brown | 700/97 |
| 6,915,364 B1 | * | 7/2005 | Christensen et al. | 710/104 |
| 6,983,229 B2 | * | 1/2006 | Brown | 703/6 |
| 7,039,472 B2 | * | 5/2006 | Sugimoto et al. | 700/14 |
| 2002/0184410 A1 | | 12/2002 | Apel et al. | |
| 2003/0014536 A1 | | 1/2003 | Christensen et al. | |
| 2003/0187530 A1 | | 10/2003 | Hotta et al. | |
| 2003/0222090 A1 | * | 12/2003 | Abdulhay et al. | 221/3 |
| 2004/0208158 A1 | * | 10/2004 | Fellman et al. | 370/345 |
| 2004/0260584 A1 | * | 12/2004 | Terasawa | 705/7 |

(Continued)

FOREIGN PATENT DOCUMENTS

GB    2405705    3/2005

(Continued)

OTHER PUBLICATIONS

Emerson Process Management, "Delta V, Configuration Software Suite," Product Data Sheet, Feb. 2006 (7 pages).

(Continued)

*Primary Examiner*—Paul L Rodriguez
*Assistant Examiner*—Carlos Ortiz Rodriguez
(74) *Attorney, Agent, or Firm*—Hanley, Flight and Zimmerman, LLC

(57) ABSTRACT

An example apparatus includes a first interface configured to identify a first function associated with a process control routine. The example apparatus also includes a sub-schedule generator configured to generate a first sub-schedule associated with a first time period. The first sub-schedule indicates a first execution time at which the first function is to be executed. The example apparatus also includes a schedule generator configured to form a schedule associated with a second time period based on two instances of the first sub-schedule. The schedule indicates the first execution time and a second execution time at which the first function is to be executed.

19 Claims, 21 Drawing Sheets

U.S. PATENT DOCUMENTS

| | | | |
|---|---|---|---|
| 2005/0050515 A1* | 3/2005 | Shah et al. | 717/113 |
| 2005/0113950 A1* | 5/2005 | Brown | 700/97 |
| 2006/0200372 A1 | 9/2006 | O'Cull et al. | |
| 2006/0206218 A1 | 9/2006 | Glanzer et al. | |
| 2006/0293797 A1* | 12/2006 | Weiler | 700/284 |
| 2008/0249641 A1 | 10/2008 | Enver et al. | |

FOREIGN PATENT DOCUMENTS

| | | |
|---|---|---|
| GB | 2442356 | 4/2008 |
| WO | WO0197158 | 12/2001 |

OTHER PUBLICATIONS

Fisher Rosemount, "Foundation Fieldbus Blocks," Rev BA, 2000 (102 pages).

The Fieldbus Foundation, "System Engineering Guidelines," Revision 2, Aug. 2004 (94 pages).

Terry Blevins et al., "Providing Effective Control of Processes with Variable Delay Response," Instrument Society of America, Oct. 22, 2002 (10 pages).

Fisher-Rosemount Systems, Inc., "DeltaV Control Module Execution," Jan. 2002 (8 pages).

European Patent issued on Sep. 25, 2009, the extended European search report in European patent appliction No. 08173053.3-2206, 8 pages.

Heiko Meyer, "Synergie aus Feldbus and Ethernet. Realisierung eines geeigneten Netzubergangs von Foundation Fieldbus H1 zu High Speed Ethernet," Oct. 1, 2004, pp. 97-99, [Retrieved from the Internet: http://www.softing.com/home/de/pdf/is/professional-article/foundation-fieldbus/2004/0410_sps_industrial_ethernet.pdf].

Samson, "Technical Information. Foundation Fieldbus. Part 4: Communication," Jan. 1, 2000, pp. 1-44, [Retrieved from the Internet: http://www.samson.de/pdf_en/1454en.pdf].

United Kingdom Intellectual Property Office, "Search Report," issued in connection with U.K. Patent Application Serial No. GB0823049.2, on Mar. 27, 2009 (2 pages).

Fisher-Rosemount, "Fieldbus Technical Overview: Understanding Foundation™ Fieldbus Technology," 1998 (26 pages).

Emerson Process Management, "Answers to Your Questions About Implementing Fieldbus in DeltaV Systems," Oct. 2005 (22 pages).

Fisher-Rosemount, "The Basics of Fieldbus," 1998 (4 pages).

United Kingdom Intellectual Property Office, "Search Report," issued in connection with U.K. Patent Application Serial No. GB0719098.6, on Dec. 20, 2007 (3 pages).

* cited by examiner

800⤹

| BLOCK RAW EXECUTION PERIOD ($T_{BRE}$) (ms) | 0 TO 500 | >500 TO 1000 | >1000 TO 2000 | >2000 |
|---|---|---|---|---|
| ROUNDED BLOCK RAW EXECUTION PERIOD ($RT_{BRE}$) (ms) | 500 | 1000 | 2000 | 4000 |

| FIELD DEVICE/ FUNCTION BLOCK | BLOCK SCAN RATE FACTOR $F_{BSR}$ | $T_{BRE}$ (ms) | $RT_{BRE}$ (ms) | QUANTITY OF START TIME OFFSET(S) |
|---|---|---|---|---|
| PDT1/FFAI1 | 4 | 500x4=2000 | 2000 | 1 |
| PDT1/FFPID1 | 4 | 500x4=2000 | 2000 | 1 |
| PDT2/FFAI2 | 1 | 500x1=500 | 500 | 1 |
| PDT3/FFPID2 | 1 | 500x1=500 | 500 | 1 |
| PDT3/FFAO1 | 1 | 500x1=500 | 500 | 1 |

FIG. 9

METHODS AND APPARATUS TO GENERATE SCHEDULES TO EXECUTE FUNCTIONS IN A PROCESS CONTROL SYSTEM

FIELD OF THE DISCLOSURE

The present disclosure relates generally to process control systems and, more particularly, to methods and apparatus to generate schedules to execute functions in a process control system.

BACKGROUND

Process control systems, like those used in chemical, petroleum or other processes, typically include one or more centralized process controllers communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform functions within the process such as opening or closing valves and measuring process parameters. The process controller receives signals indicative of process measurements made by the field devices and/or other information pertaining to the field devices, uses this information to implement a control routine, and then generates control signals that are sent over the buses or other communication lines to the field devices to control the operation of the process. Information from the field devices and the controllers may be made available to one or more applications executed by the operator workstation to enable an operator to perform desired functions with respect to the process, such as viewing the current state of the process, modifying the operation of the process, etc.

Process control system applications typically include process control routines that can be configured to perform various functions or operations in a process control system. For example, process control routines may be used to control valves, motors, boilers, heaters, etc. Process control routines may also be used to monitor field devices, modules, plant areas, etc. and collect information associated with a process control system. Field devices used to implement the process control routines are typically coupled to one another and to a process controller via a data bus. Data buses have limited resources including limited bandwidth available for field devices and process controllers to communicate information to one another. To ensure that sufficient time is available on the data bus for all field devices and controllers to execute their respective functions and communicate information therebetween, schedules are generated to indicate when the controllers and the field devices should execute their respective functions.

SUMMARY

Example apparatus and methods to generate schedules to execute functions in a process control system are described. In accordance with an example, an example apparatus includes a first interface configured to identify a first function associated with a process control routine. The example apparatus also includes a sub-schedule generator configured to generate a first sub-schedule associated with a first time period. The first sub-schedule indicates a first execution time at which the first function is to be executed. The example apparatus also includes a schedule generator configured to form a schedule associated with a second time period based on two instances of the first sub-schedule. The schedule indicates the first execution time and a second execution time at which the first function is to be executed.

In accordance with another example, an example method involves generating a first quantity of start time offsets indicating a quantity of executions of a first function during a first sub-schedule associated with a first time period. The example method also involves generating a second quantity of start time offsets indicating a quantity of executions of a second function during the first sub-schedule. The first quantity of start time offsets is different from the second quantity of start time offsets. The example method also involves generating a schedule associated with a second time period based on two instances of the first sub-schedule.

BRIEF DESCRIPTION OF THE DRAWINGS

FIG. 8 is an example rounding table that may be used to round up block raw execution periods of function blocks.

FIG. 9 is an example quantity of start time offset table 900 that shows the quantity of start time offsets required by function blocks of FIGS. 1 and 2 for execution during respective sub-schedules.

DETAILED DESCRIPTION

Figure 1:
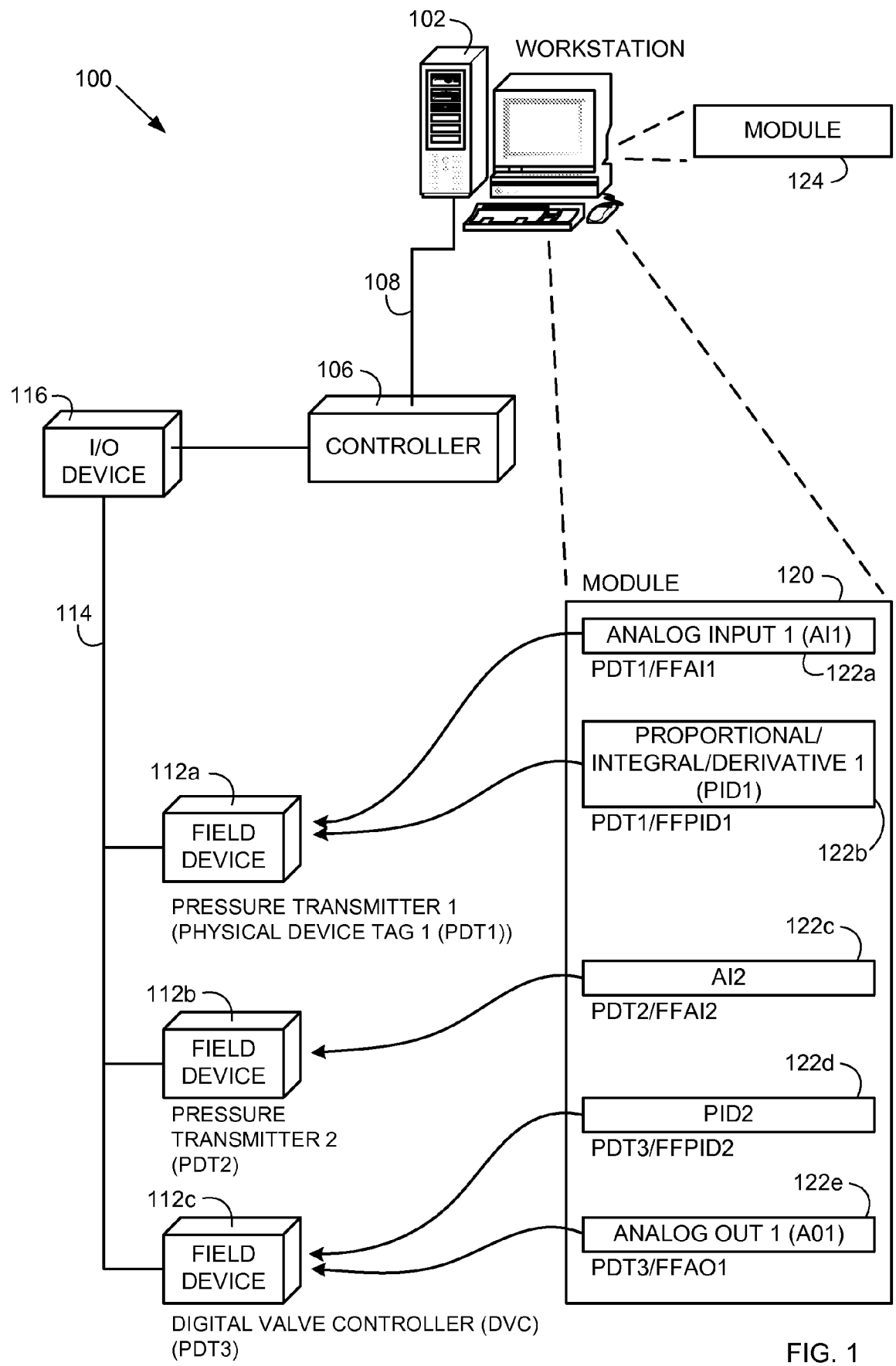
FIG. 1 is a block diagram illustrating an example process control system.

Although the following describes example apparatus and systems including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the following describes example apparatus and systems, persons of ordinary skill in the art will readily appreciate that the examples provided are not the only way to implement such apparatus and systems.

Known techniques used to generate schedules for executing function blocks by process controllers and field devices in a process control system typically involve scheduling all function blocks associated with the same communication bus (e.g., a communication bus communicatively coupling the field devices and controllers assigned to execute the function blocks) to execute at the rate of the slowest-executing function block. Therefore, known techniques require increasing the block execution periods (e.g., slowing the function block execution rates) of relatively faster executing function blocks to match the block execution periods of the slowest executing function block and, thus, the smaller execution periods (i.e., faster execution rates) of some function blocks cannot be advantageously used to implement a process control system.

Unlike some known techniques used to implement schedules for executing function blocks, the example methods and apparatus described herein may be used to generate schedules for executing function blocks based on their respective function block execution periods without having to substantially increase the function block execution periods to match the function block execution periods of other function blocks associated with (e.g., communication via) the same communication bus. Executing some function blocks faster than other, slower function blocks associated with the same communication bus may be advantageous. For example, if a pressure measurement function block and a valve control function block are associated with the same communication bus, it may be advantageous to execute the pressure measurement function block using a shorter period (e.g., at a faster rate) while executing the valve control function block using a shorter period may not be of much advantage. Accordingly, the function block execution period of a pressure measurement function block may be shorter than the function block execution period of the valve control function block. Using the known techniques to schedule the function block executions would require the pressure measurement function block to execute using the same, slower period of the valve control function block. As a result, the pressure measurement function block may fail to capture higher-frequency pressure variations in a process. In contrast, using the example methods and apparatus described herein to generate schedules for executing function blocks using their respective block execution rates enables the pressure measurement function block to be executed using a shorter period (e.g., at a faster execution rate) than the valve control function block. Thus, the pressure measurement function block can acquire pressure measurements more frequently (e.g., at a relatively high resolution) to, for example, capture higher-frequency pressure variations (e.g., blips, spikes, or other relatively high-frequency changes in pressure) that would otherwise not be captured or processed using known function block scheduling techniques.

Using block execution rates of respective function blocks to generate schedules as described herein enables scheduling a plurality of process loops to be executed by field devices or controllers communicatively coupled to the same communication bus while ensuring that the process loops can be executed at their respective loop execution periods. That is, process loops associated with a shorter loop execution period (e.g., a faster loop execution rate) can be executed relatively faster than process loops having longer loop execution periods (e.g., slower loop execution rates). In this manner, unlike some known methods used to generate schedules for executing function blocks, loop execution periods of all of the loops associated with the same communication bus do not have to be made equal to the longest loop execution.

Now turning to FIG. 1, an example process control system 100 that may be used to implement the example methods and apparatus described herein includes a workstation 102 (e.g., an application station, an operator station, etc.), and a controller 106, both of which may be communicatively coupled via a bus or local area network (LAN) 108, which is commonly referred to as an application control network (ACN). The LAN 108 may be implemented using any desired communication medium and protocol. For example, the LAN 108 may be based on a hardwired or wireless Ethernet communication scheme, which is well known and, thus, is not described in greater detail herein. However, as will be readily appreciated by those having ordinary skill in the art, any other suitable communication medium and protocol could be used. Further, although a single LAN is shown, more than one LAN and appropriate communication hardware within the workstation 102 may be used to provide redundant communication paths between the workstation 102 and a respective similar workstation (not shown).

The workstation 102 may be configured to perform operations associated with one or more information technology applications, user-interactive applications, and/or communication applications. For example, the workstation 102 may be configured to perform operations associated with process control-related applications and communication applications that enable the workstation 102 and the controller 106 to communicate with other devices or systems using any desired communication media (e.g., wireless, hardwired, etc.) and protocols (e.g., HTTP, SOAP, etc.). The workstation 102 may be implemented using any suitable computer system or processing system (e.g., the processor system 2310 of FIG. 23). For example, the workstation 102 could be implemented using a single processor personal computer, single or multi-processor workstations, etc.

The controller 106 may perform one or more process control routines that have been generated by a system engineer or other system operator using the workstation 102 or any workstation and which have been downloaded to and instantiated in the controller 106. The controller 106 may be, for example, a DeltaV™ controller sold by Fisher-Rosemount Systems, Inc. and Emerson Process Management™. However, any other controller could be used instead. Further, while only one controller is shown in FIG. 1, additional controllers of any desired type or combination of types can be coupled to the LAN 108.

The controller 106 may be coupled to a plurality of field devices 112a-c via a digital data bus 114 and an input/output (I/O) device 116. During execution of a process control routine, the controller 106 may exchange information (e.g., commands, configuration information, measurement information, status information, etc.) with the field devices 112a-c. For example, the controller 106 may be provided with a process control routine that, when executed by the controller 106, causes the controller 106 to send commands to the field devices 112a-c that cause the field devices 112a-c to perform specified operations (e.g., perform a measurement, open/close a valve, etc.) and/or to communicate information (e.g., measurement data) via the digital data bus 114.

To identify the field devices 112a-c within the process control system 100, each of the field devices 112a-c is provided with (e.g., stores) a unique physical device tag (PDT). For example, the physical device tag of the first field device 112a is PDT1, the physical device tag of the second field device 112b is PDT2, and the physical device tag of the third field device 112c is PDT3. In the illustrated example, the field devices 112a-c include a first pressure transmitter 112a, a second pressure transmitter 112b, and a digital valve controller (DVC) 112c. However, any other types of field devices (e.g., valves, actuators, sensors, etc.) may be used in connection with the example methods and apparatus described herein.

In the illustrated example, the field devices 112a-c are Fieldbus compliant devices configured to communicate via the digital data bus 114 using the well-known Fieldbus protocol. In accordance with the Fieldbus standard, the digital data bus 114 is a digital, two-way, multi-drop communication bus configured to be communicatively coupled to measurement and control devices (e.g., the field devices 112a-c). The field devices 112a-c are shown communicatively coupled to the digital data bus 114 in a multi-drop configuration. The digital data bus 114 or similar data buses may alternatively be used to communicatively couple field devices to the I/O device 116 using a point-to-point configuration in which one field device is afforded exclusive use of a digital data bus to communicate with the I/O device 116. In alternative example implementations, the methods and apparatus may be used in connection with other types of field devices (e.g., Profibus or HART compliant devices that communicate via the data bus 114 using the well-known Profibus and HART communication protocols), which may or may not include Fieldbus-compliant devices. The digital data bus 114 is also referred to herein as a segment. A segment is a Fieldbus term that describes a physical bus that is terminated in its characteristic impedance. In the illustrated example of FIG. 1, the digital data bus 114 forms a segment. The example methods and apparatus described herein may be implemented in connection with a single segment (e.g., the digital data bus 114) or two or more segments (e.g., the digital data bus 114 and one or more other digital data buses) linked using repeaters to form a longer logical bus.

In the illustrated example, the I/O device 116 is implemented using an I/O subsystem interface that enables connecting the controller 106 and the field devices 112a-c to other field devices, which may use the Fieldbus protocol or other types of communication protocols (e.g., Profibus protocol, HART protocol, etc.). For example, the I/O device 116 may include one or more gateways that translate between the Fieldbus protocol and other communication protocols. Additional I/O devices (similar or identical to the I/O device 116) may be coupled to the controller 106 to enable additional groups of field devices to communicate with the controller 106.

The example process control system 100 is provided to illustrate one type of system within which the example methods and apparatus described in greater detail below may be advantageously employed. However, the example methods and apparatus described herein may, if desired, be advantageously employed in other systems of greater or less complexity than the example process control system 100 shown in FIG. 1 and/or systems that are used in connection with process control activities, enterprise management activities, communication activities, etc.

In the illustrated example of FIG. 1, a module 120 is configured at the workstation 102 to define a process control routine to be executed by the controller 106 and/or the field devices 112a-c. The module 120 includes a plurality of function blocks 122a-e that define functions to be performed by the field devices 112a-c to implement the process control routine. The functions may cause the field devices 112a-c to acquire measurement values (e.g., pressure values, temperature values, flow values, voltage values, current values, etc.), perform algorithms or calculations (e.g., integrations, derivatives, additions, subtractions, etc.), control instrumentation (e.g., opening/closing valves, furnace adjustments, boiler adjustments, etc.), or to perform any other functions. In the illustrated example, the field devices 112a-c store and execute functions defined by respective ones of the function blocks 122a-e in the form of machine executable instructions. However, in other example implementations, instead of or in addition to one or more of the function blocks 122a-e, the module 120 may be provided with function blocks representing functions that are executed by the controller 106 instead of one of the field devices 112a-c.

The workstation 102 may also be used to configure another module 124 having one or more other function blocks (not shown) executed by the field devices 112a-c and/or the controller 106. Although two modules (the modules 120 and 124) are shown, more modules may be configured at the workstation 102 having additional function blocks to be executed by the controller 106 and/or the field devices 112a-c. The other module(s) may be used to implement other process control routines and/or to implement a process control routine in connection with the modules 120 and 124.

In the illustrated example, the function blocks 122a-e include a first analog input (AI1) function block 122a, a first proportional/integral/derivative (PID1) function block 122b, a second analog input (AI2) function block 122c, a PID2 function block 122d, and an analog output (AO1) function block 122e. The AI1 function block 122a and the PID1 function block 122b define functions to be executed by the field device 112a. The AI2 function block 122c defines a function to be executed by the field device 112b. The PID2 function block 122d and the AO1 function block 122e define functions to be executed by the field device 112c. In alternative example implementations, any other types of functions blocks can be used instead of or in addition to the function blocks 122a-e.

Figure 2:
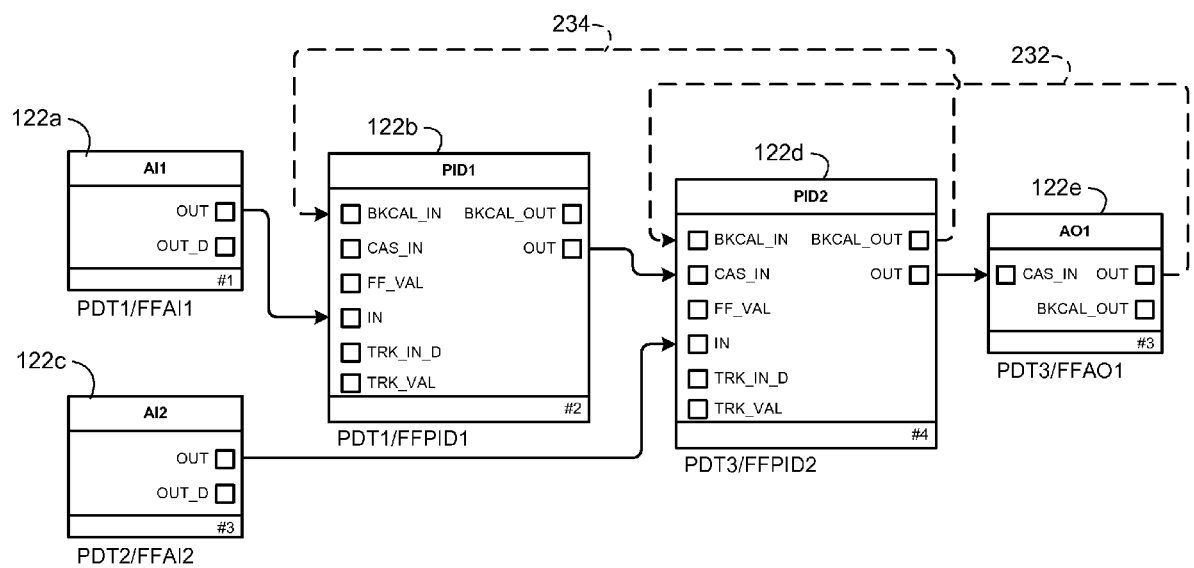
FIG. 2 depicts graphical user interface (GUI) representations of the function blocks used to implement a process control routine in the example process control system of FIG. 1 and interconnections between the function blocks.

FIG. 2 depicts graphical user interface (GUI) representations of the function blocks 122a-e. The function blocks 122a-e may be interconnected by a user (e.g., an engineer, an operator, etc.) using a GUI-based design software application executed by, for example, the workstation 102. As shown in FIG. 2, each of the function blocks 122a-e includes one or more inputs and/or one or more outputs. Connecting the inputs and/or outputs of the function blocks 122a-e defines the process control routine of the module 120 (FIG. 1). The connections between the function blocks 122a-e are referred to herein as function block connection wires. In the illustrated example, an output of the AI1 function block 122a is connected to an input of the PID1 function block 122b; outputs of the PID1 function block 122b and the AI2 function block 122c are connected to inputs of the PID2 function block 122d; and an output of the PID2 function block 122d is connected to an input of the AO1 function block 122e.

Figure 3:
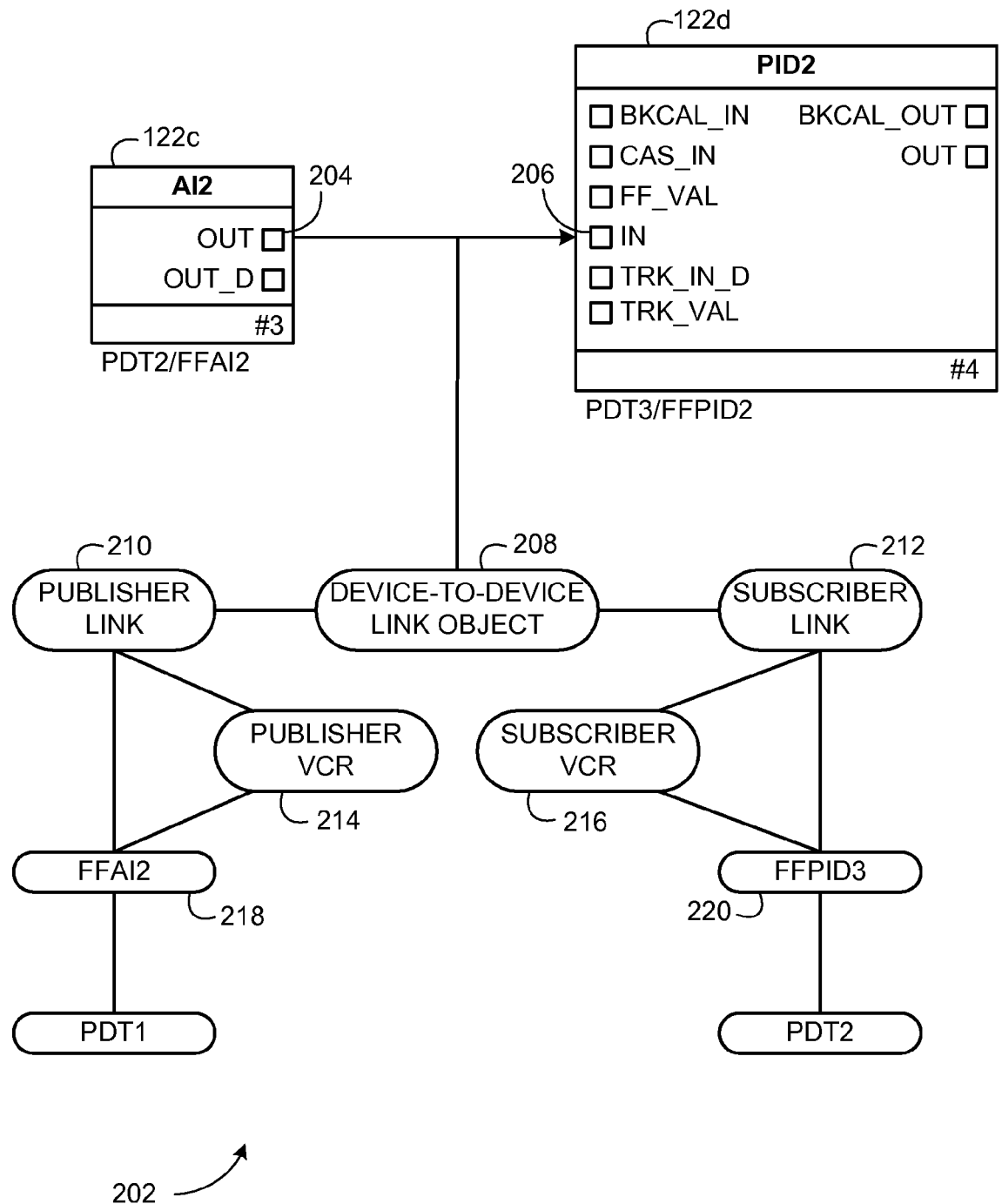
FIG. 3 is an example function block binding configuration that binds function blocks associated with different field devices of the process control system of FIG. 1 via a communication bus.

Turning briefly to FIG. 3, an example function block binding configuration 202 (i.e., the binding configuration 202) is provided for exemplary purposes to show a manner in which an output 204 of the AI2 function block 122c can be bound to an input 206 of the PID2 function block 122d to enable communicating information from the AI2 function block 122c to the PID2 function block 122d. A binding process generates the binding configuration 202 based on the connections between function blocks (e.g., the function blocks 122a-e of FIGS. 1 and 2). A binding process can be executed by, for example, the workstation 102 any time a new function block connection (e.g., the connection between the output 204 and the input 206) is made to enable the function blocks to exchange information in accordance with the function block interconnections.

The binding process is configured to create intra-device links to enable intra-device communications and inter-device links to enable inter-device communications. An intra-device link defines a connection between two function blocks associated with the same device. For example, an intra-device link defines a connection between the AI1 function block 122a (FIGS. 1 and 2) and the PID1 function block 122b (FIGS. 1 and 2) because the functions defined by the function blocks 122a and 122b are executed by the same device (the field device 112a of FIG. 1). An inter-device link defines a connection between a function block in one field device and a function block in another field device that causes the field devices to communicate via a communication bus (e.g., the digital data bus 114 of FIG. 1) communicatively coupling the two field devices. For example, an inter-device link defines the connection between the AI2 function block 122c (FIGS. 1-3) and the PID2 function block 122d because the function associated with the AI2 function block 122c is executed by the field device 112b (FIG. 1) and the function associated with the PID2 function block 122d is executed by the field device 112c (FIG. 1).

In the illustrated example of FIG. 3, a binding process creates an inter-device link configuration to bind the AI2 function block 122c to the PID2 function block 122d. Initially, the binding process creates a device-to-device link object 208 (e.g., an inter-device link object) that contains information to link the output 204 to the input 206. In an alternative example implementation used to bind function blocks associated with the same device, the binding process would create an intra-device link object (not shown). In the example binding configuration 202 of FIG. 3, the binding process then creates a publisher link 210, associates the publisher link 210 with the output 204, and binds the publisher link 210 to the device-to-device link object 208. Also, the binding process creates a subscriber link 212, associates the subscriber link 212 with the input 206, and binds the subscriber link 212 to the device-to-device link object 208.

The binding process also creates a publisher virtual communication resource (VCR) 214 and subscriber VCR 216. A VCR maintains (or persists) the identity of a connection between function blocks so that any communication between the function blocks can be made using the VCR identity. In the illustrated example, the publisher VCR 214 associates a unique identification 218 of the AI2 function block 122c with the publisher link 210 and the subscriber VCR 216 associates a unique identification 220 of the PID2 function block 122d with the subscriber link 212. In general publisher/subscriber VCR's (e.g., the publisher and subscriber VCR's 214 and 216) enable buffered communications between function blocks including one-to-many broadcast communications (e.g., one function block broadcasts information to many function blocks). In the illustrated example, after the AI2 function block 122c generates new data, it communicates (or publishes) the data via the output 204 to the PID2 function block 122d. The PID2 function block 122d is a subscriber to the output 204 and, thus, receives the data published via the output 204.

Returning to FIG. 2, the function blocks 122a-e are coupled or connected to form loops. In particular, an output of the AO1 function block 122e is coupled or connected to an input of the PID2 function block 122d to form a PID2-AO1 loop 232. Also, an output of the PID2 function block 122d is connected to an input of the PID1 function block 122b to form a PID1-PID2 loop 234. In the illustrated example, the PID1-PID2 loop 234 executes less often (e.g., has a longer loop execution period or a slower loop execution rate) than the PID2-AO1 loop 232.

The loop execution period of the loop 232 is based on the block scan rates (BSR's) of the function blocks 122c-e and the loop execution period of the loop 234 is based on the block scan rates of the function blocks 122a-b. A block scan rate defines how often a function block communicates or publishes information to another function block. For example, if the field device 112a executes the AI1 function block 122a and publishes information on the digital data bus 114 every 2000 ms, the block scan rate of the AI1 function block 122a is 2000 ms. The amount of time required for a field device (or a controller) to execute a respective function block is referred to herein as a block execution time. For example, if the field device 112a requires 20 milliseconds (ms) to execute the AI1 function block 122a, the block execution time of the AI1 function block 122a is 20 ms. Block execution times $t_{E1}$, $t_{E2}$, $t_{E3}$, $t_{E4}$, and $t_{E5}$ associated respectfully with the function blocks 122a-e are shown by way of example in FIGS. 4 and 5. The block scan rates typically vary between function blocks.

In the illustrated example, the block scan rates associated with the function blocks 122a and 122b are less than the block scan rates associated with the function blocks 122c-e. As a result, the PID1-PID2 loop 234 executes less often (e.g., a slower loop rate, a longer loop periodicity, etc.) than the PID2-AO1 loop 232.

Figure 4:
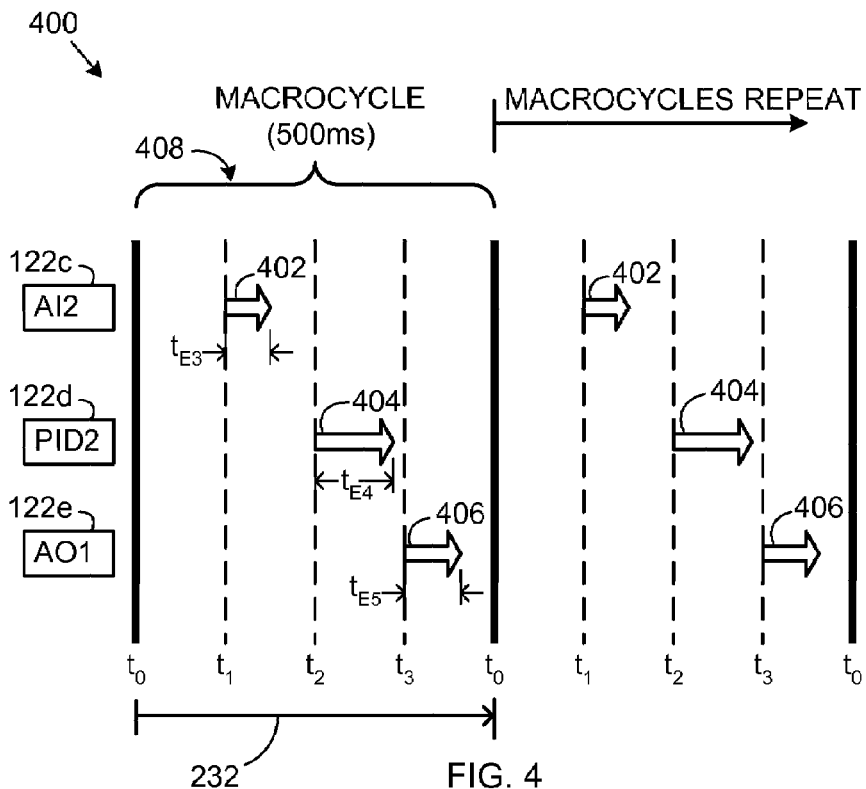
FIG. 4 is an example execution sequence diagram that depicts the timing relationships between executions of some of the function blocks of FIGS. 1 and 2 during two consecutive 500 millisecond loop executions.

Turning to FIG. 4, an example execution sequence diagram 400 depicts the timing relationships between executions of the function blocks 122c-e during two consecutive loop executions of the loop 232 of FIG. 2. The executions of the AI2 function block 122c are indicated by reference numeral 402, the executions of the PID2 function block 122d are indicated by reference numeral 404, and the executions of the AO1 function block 122e are indicated by reference numeral 406. A macrocycle is used herein to refer to a single execution of a loop (e.g., a single execution of the loop 232). The amount of time required to execute a loop is typically based on the function block in the loop having the least frequent block scan rate. In known systems, each function block associated with a macrocycle must be executed only once during that macrocycle. For example, in FIG. 4, each of the function blocks 122c-e is shown as being executed only once during a macrocycle 408 having a 500 millisecond period. In known systems, field devices on the same segment (e.g., the field devices 112a-c on the digital data bus 114) must execute their respective function blocks based on the same macrocycle. That is, known design guidelines of known systems specify against running different macrocycles on a single segment (e.g., the digital data bus 114). If another function block is introduced into the loop 232 having a less frequent scan rate (e.g., a two-second scan rate), the period of the macrocycle 408 must be increased to accommodate execution of all the function blocks (e.g., the function blocks 122c-e and the additional function block having a two-second scan rate) once during the macrocycle 408.

Figure 5:
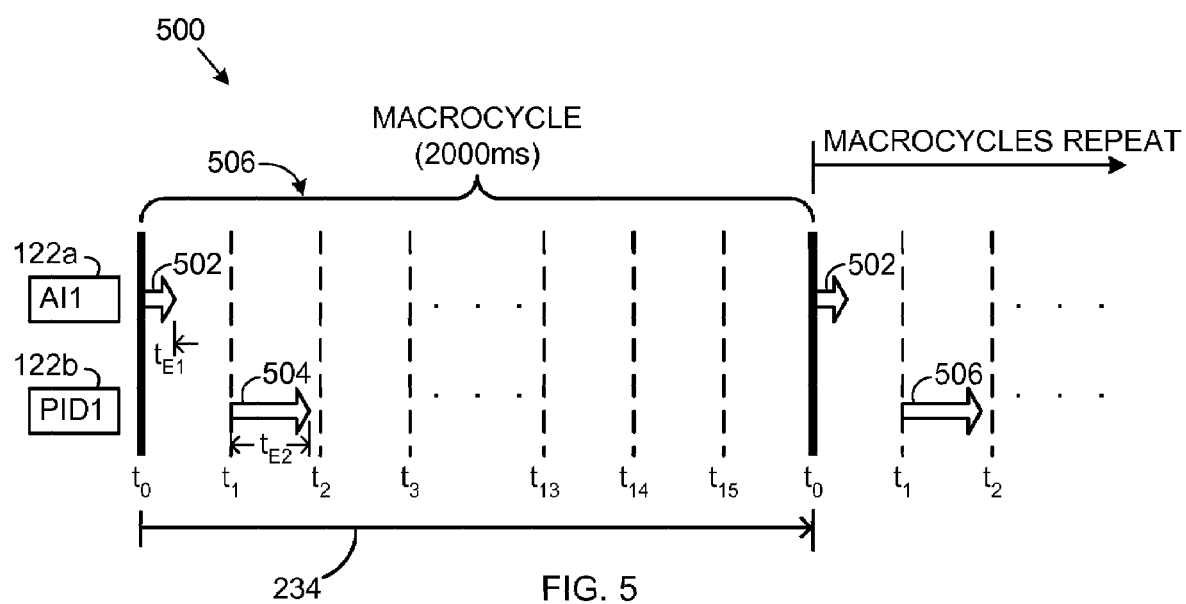
FIG. 5 is another example execution sequence diagram that depicts a timing relationships between executions of some of the function blocks of FIGS. 1 and 2 during two consecutive 2000 millisecond loop executions.

FIG. 5 illustrates another example execution sequence diagram 500 that depicts a timing relationships between executions of the function blocks 122a-b during two consecutive loop executions of the loop 234 of FIG. 2. The executions of the AI1 function block 122a are indicated by reference numeral 502 and the executions of the function block 122b are indicated by reference numeral 504. The loop 234 is executed relatively less often than the loop 232 because the function blocks 122a-b have a less frequent block scan rate than the function blocks 122c-e. In the illustrated example, a macrocycle 506 associated with the loop 234 has a duration of 2000 milliseconds to accommodate the less frequent execution of the loop 234.

Figure 6:
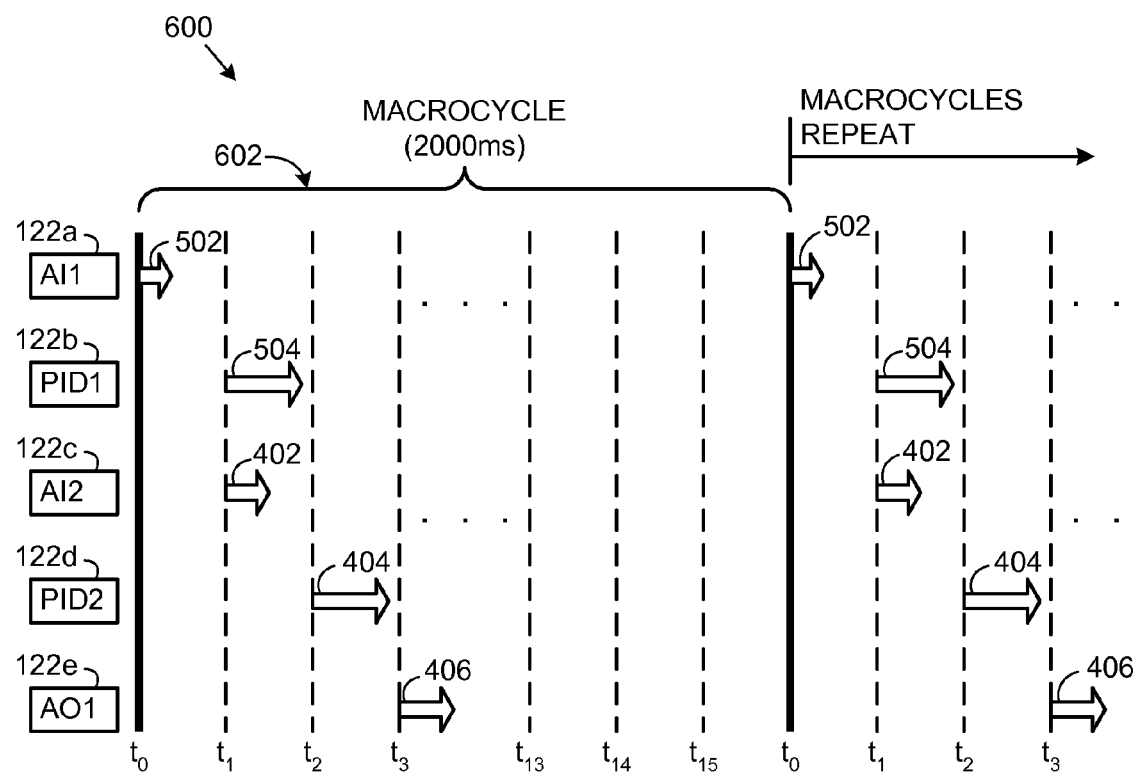
FIG. 6 is an example execution sequence diagram implemented in accordance with known methods to execute function blocks having different block scan rates and assigned to field devices communicatively coupled to the same communication bus of the example process control system of FIG. 1.

FIG. 6 illustrates an example execution sequence diagram 600 implemented in accordance with known methods to execute function blocks (e.g., the function blocks 122a-e of FIGS. 1-2, 4, and 5) having different block scan rates on the same segment (e.g., the digital data bus 114). Specifically, in accordance with known methods, to execute the function blocks 122a-e on the same segment (e.g., the digital data bus 114), a macrocycle 602 having a period of 2000 ms is selected based on the slowest block scan rate of the function blocks 122a-e. In this manner, each of the function blocks 122a-e is executed once per macrocycle 602. To implement the example execution sequence 600, the block scan rates of the function blocks 122c-e are decreased to make the loop execution period of the loop 232 equal to the loop execution period of the loop 234.

Although decreasing the block scan rates of the function blocks 122c-e enables executing the function blocks 122c-e and the function blocks 122a-b on the same segment, decreasing the block scan rates of the function blocks 122c-e prevents executing the function blocks 122c-e faster than the block scan rates of the function blocks 122a-b. In some implementations, executing the function blocks 122c-e faster than the block execution periods of the function blocks 122a-b may be advantageous. For example, if the AI2 function block 122c causes the field device 112b (FIG. 1) to acquire a pressure measurement, executing the AI2 function block 122c at 500 ms intervals as shown in FIG. 4 enables the field device 112b to acquire and publish on the digital data bus 114 a plurality of pressure measurements at a relatively high resolution (e.g., high granularity). Acquiring pressure measurements more frequently (e.g., at a relatively high resolution) as shown in FIG. 4 enables the field device 112b to, for example, capture blips, spikes, or other relatively high-frequency behavior in pressure occurring in the 500 ms range. In contrast, slowing the block scan rate of the AI2 function block 122c to generate the example execution sequence 600 using known methods prevents the field device 112b from capturing blips, spikes, or other relatively high-pressure behavior occurring in the less than 2000 ms range.

Figure 7:
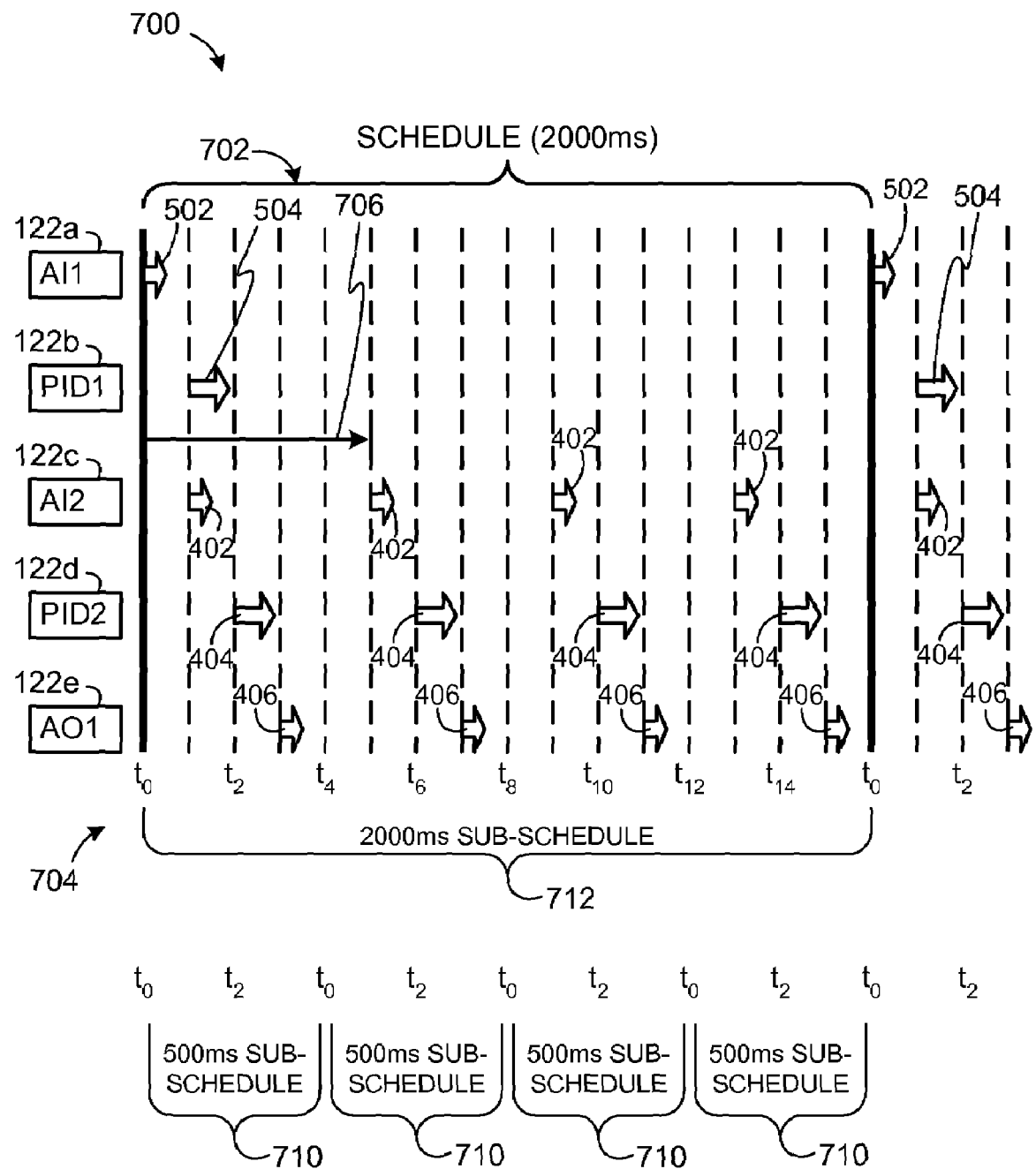
FIG. 7 is an example execution sequence diagram implemented in accordance with the example methods and apparatus described herein to enable function blocks to be executed with their block scan rates and respective loop execution periods.

Unlike known methods used to generate the example execution sequence 600 to execute multiple loops on a single segment by making the loop execution periods of all loops the same, the example methods and apparatus described herein enable scheduling multiple loops having different loop execution periods on the same segment. Turning to FIG. 7, an example execution sequence diagram 700 implemented in accordance with the example methods and apparatus described herein allows the loops 232 and 234 of FIGS. 2-4 to be executed in accordance with their respective loop execution periods. In this manner, function blocks having faster block scan rates can be executed at a faster rate than function blocks on the same segment having slower block scan rates.

To enable executing the loops 232 and 234 at their respective rates on the digital data bus 114, the example methods and apparatus described herein generate a schedule 702 (i.e., a function block execution schedule) represented in FIG. 7 as a plurality of the function block executions 402, 404, 406, 502, and 504 of the function blocks 122a-e. In the illustrated example, the schedule 700 has a schedule start time 704 beginning at time to. Each of the function block executions 402, 404, 406, 502, and 504 starts at a respective start time offset (e.g., an offset) relative to the schedule start time 704. An example start time offset 706 is depicted in FIG. 7 to show when one of the function block executions 402 of the AI2 function block 122c starts relative to the schedule start time 704.

The schedule 700 is determined based on block scan rates of the function blocks 122a-e and a module execution period ($T_{ME}$) of the module 120. The module execution period ($T_{ME}$) is equal to the inverse value of the slowest, or least frequent, block scan rate associated with a function block (e.g., one of the function blocks 122a-e) in the module 120. For example, the module scan period ($T_{ME}$) of the module 120 is 2000 ms because the AI1 function block 122a and the PID1 function block 122b have block scan rates of $$\frac{1 \text{ scan}}{2000 \text{ ms}},$$

which are slower than the $$\frac{1 \text{ scan}}{500 \text{ ms}}$$

block scan rates of the function blocks 122c-e in the module 120.

The example methods and apparatus described herein are configured to generate one or more start time offsets for each function block (e.g., each of the function blocks 122a-e). The number of start time offsets for a function block is determined based on a block raw execution period ($T_{BRE}$) of that function block and the slowest block raw execution period ($T_{SBE}$) associated with the field device configured to execute that function block. A block raw execution period ($T_{BRE}$) defines the length of time between executions of a function block regardless of schedule (e.g., the schedule 702 of FIG. 7) and can be determined according to equation 1 below.

$$T_{BRE} = T_{ME} \times F_{BSR} \qquad \text{Equation 1}$$

As shown in equation 1 above, the block raw execution period ($T_{BRE}$) for a particular function block is determined by multiplying the module execution period ($T_{ME}$) of the module containing the function block by a block scan rate factor ($F_{BSR}$) of the function block. The block scan rate factor ($F_{BSR}$) is equal to the quantity of module execution periods ($T_{ME}$) between the start times of two consecutive executions of a function block and may be determined using equation 2 below.

$$F_{BSR} = \frac{T_{ME}}{BSR} \qquad \text{Equation 2}$$

Referring to equation 2 above and FIG. 7, if the module execution period ($T_{ME}$) of the module 120 (FIG. 1) is 2000 ms and the function block 122a is configured to be executed every 2000 ms (BSR=2000 ms), the block scan rate factor ($F_{BSR}$) of the AI1 function block 122a is equal to one because one module execution period ($T_{ME}$) elapses between the starts of two consecutive executions of the AI1 function block 122a. In FIG. 7, the AI2 function block 122c is shown as executing every 500 ms (BSR=500 ms). Therefore, the block scan rate factor ($F_{BSR}$) of the AI2 function block 122c is equal to one-fourth (0.25) because only one-fourth of the module execution period ($T_{ME}$) elapses between the starts of two consecutive executions of the AI2 function block 122c.

Referring again to equation 1 above, if the module execution period ($T_{ME}$) of the module 120 is 2000 ms and the block scan rate factor ($F_{BSR}$) of the AI1 function block 122a is equal to one, the block raw execution period ($T_{BRE}$) of the AI1 function block 122a is equal to 2000 ms indicating that the AI1 function block 122a executes every 2000 ms. However, the block raw execution period ($T_{BRE}$) of the AI2 function block 122c is equal to 500 ms because the block scan rate factor ($F_{BSR}$) of the AI2 function block 122c is one-fourth (e.g., 500 ms ($T_{BRE}$)=2000 ms ($T_{ME}$)×¼($F_{BSR}$)).

After the block raw execution period ($T_{BRE}$) is determined based on equation 1 above, the block raw execution period ($T_{BRE}$) is rounded up based on rounding table 800 of FIG. 8. The block raw execution period ($T_{BRE}$) is rounded up to ensure that function block executions (e.g., the function block executions 402, 404, 406, 502, and 504 of FIG. 7) do not skew in time after several repetitions of the schedule 702 (FIG. 7) and to determine the quantity of start time offsets ($Q_s$) required for each function block based on rounded block raw execution period ($RT_{BRE}$) boundaries. As shown in the rounding table 800, if the block raw execution period ($T_{BRE}$) of a function block is between 0 and 500 ms, the block raw execution period ($T_{BRE}$) is rounded up to the rounded block raw execution period ($RT_{BRE}$). Similarly, if the block raw execution period ($T_{BRE}$) of a function block is between 500 and 1000 ms or between 1000 ms and 2000 ms or greater than 2000 ms, the block raw execution period ($T_{BRE}$) is rounded up to a rounded block raw execution period ($RT_{BRE}$) value of 1000 ms, 2000 ms, or 4000 ms, respectively.

Returning to FIG. 7, the schedule 702 is implemented using sub-schedules 710 and 712. In the illustrated example, the sub-schedule 710 has a 500 ms period and is associated with a loop execution of the loop 232 of FIGS. 2 and 4. The sub-schedule 712 has a 2000 ms period and is associated with a loop execution of the loop 234 of FIGS. 2 and 5. During generation of the schedule 702, the sub-schedule 710 is generated first and then it is replicated three times as shown in FIG. 7 to fill in the 2000 ms schedule 702. After generating the sub-schedule 710, the next shortest-period sub-schedule (e.g., the sub-schedule 712) is generated. After generating the sub-schedules 710 and 712, the sub-schedules 710 and 712 are merged to generate the schedule 702.

As shown in FIG. 7, during the sub-schedule 710, each of the executions 402, 404, and 406 occurs once. Therefore, each of the function blocks 122c-e requires only one start time offset for the sub-schedule 710. Also, during the sub-schedule 712, each of the function blocks 122a-b is executed only once. Therefore, each of the function blocks 122a-b requires only one start time offset for the sub-schedule 712.

The quantity of start time offsets ($Q_s$) (e.g., the start time offset 706) for a sub-schedule (e.g., the sub-schedule 710 or the sub-schedule 712) required by a function block (e.g., one of the function blocks 122a-e of FIGS. 1 and 2) is determined based on the rounded block raw execution period ($RT_{BRE}$) of the function block and the slowest rounded block raw execution period ($RT_{SRE}$) associated with the field device (e.g., one of the field devices 112a-c of FIG. 1) that executes the function block. The quantity of start time offsets ($Q_s$) for a function block can be determined using equation 3 below.

$$Q_S = \frac{RT_{SRE}}{RT_{BRE}} \qquad \text{Equation 3}$$

As shown in equation 3 above, the quantity of start time offsets ($Q_s$) for a function block is determined by dividing the slowest rounded block raw execution period ($RT_{SRE}$) associated with the field device that executes the function block by the rounded block raw execution period ($RT_{BRE}$) of the function block.

Using equation 3 to determine the quantity of start time offsets ($Q_s$) for the PID2 function block 122d involves first determining the slowest rounded block raw execution period ($RT_{SRE}$) associated with the field device 112c, which executes the PID2 function block 122d. In the illustrated example, the PID2 and AO1 function blocks 122d-e are the only function blocks executed by the field device 112c. Therefore, the slowest rounded block raw execution period ($RT_{SRE}$) associated with the field device 112c is equal to the rounded block raw execution period ($RT_{BRE}$) of one of the function blocks 122d-e having the slower rounded block raw execution period ($RT_{BRE}$). Because the rounded block raw execution periods ($RT_{BRE}$) of the function blocks 122*d-e* are both equal to 500 ms, the slowest rounded block raw execution period ($RT_{SRE}$) is set equal to 500 ms.

After determining the slowest rounded block raw execution period ($RT_{SRE}$) associated with the field device 112*c*, equation 3 can be used to determine the quantity of start time offsets ($Q_s$) required for the PID2 function block 122*d* by dividing 500 ms (the slowest rounded block raw execution period ($RT_{SRE}$) associated with the field device 112*c*) by 500 ms (the rounded block raw execution period ($RT_{BRE}$) of the PID2 function block 122*d*). The division operation indicates that the quantity of start time offsets ($Q_s$) required by the PID2 function block 122*d* to execute in the sub-schedule 710 is one.

An example quantity of start time offset table 900 of FIG. 9 shows the quantity of start time offsets ($Q_s$) required by the function blocks 122*a-b* for execution during the sub-schedule 712 of FIG. 7 and the quantity of start time offsets ($Q_s$) required by the function blocks 122*c-e* for execution during the sub-schedule 710 of FIG. 7. The quantity of start time offset table 900 also shows the block scan rate factor ($F_{BSR}$), the block raw execution periods ($T_{BRE}$) and the rounded block raw execution periods ($RT_{BRE}$).

Figures 10, 11:
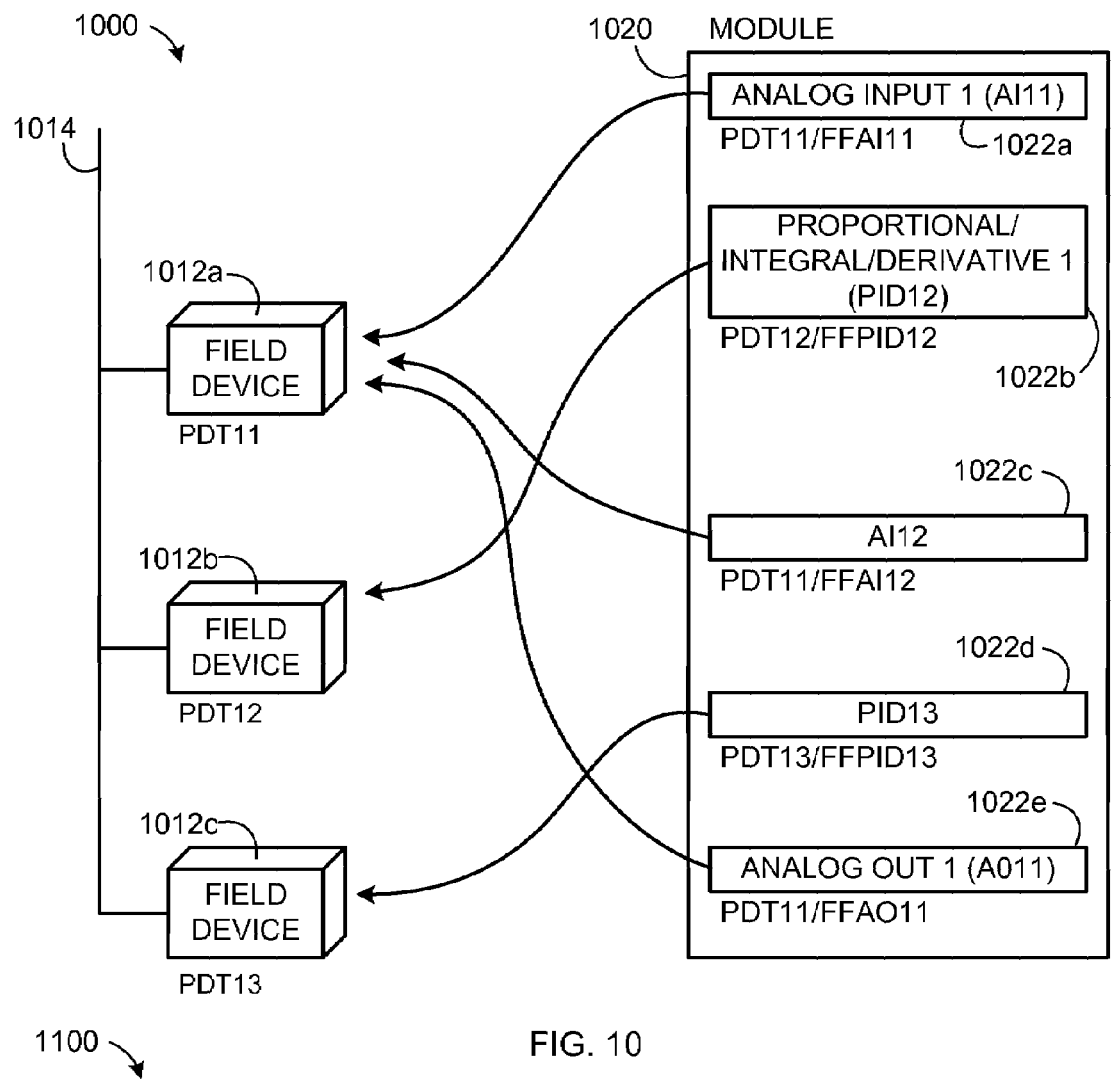
FIG. 10 depicts another example function block configuration in which a plurality of field devices are communicatively coupled to a communication bus of a process control system and configured to execute respective function blocks.
FIG. 11 depicts another example quantity of start time offset table 1100 showing the quantity of start times required for each function block of the example function block configuration of FIG. 10.

FIG. 10 depicts another example function block configuration 1000 in which a plurality of field devices 1012*a-c* are communicatively coupled to a digital data bus 1014 to implement a process control system based on function blocks 1022*a-e* of a module 1020. Unlike the function blocks 122*a-e* of FIGS. 1 and 2 that require only one start time offset as shown in the quantity of start time offset table 900 of FIG. 9, some of the function blocks 1022*a-e* shown in FIG. 10 require a plurality of start time offsets as described below. The plurality of field devices 1012*a-c* are similar or identical to the field devices 112*a-c* of FIG. 1 and the digital data bus 1014 is similar or identical to the digital data bus 114 of FIG. 1. As shown in FIG. 10, the field device 1012*a* executes functions defined by an AI11 function block 1022*a*, an AI12 function block 1022*c*, and an AO11 function block 122*e*, the field device 1012*b* executes a function defined by a PID12 function block 1022*b*, and a field device 1012*c* executes a function defined by a PID 13 function block 1022*d*.

The AI11 function block 1022*a* is similar or identical to the AI1 function block 122*a* of FIGS. 1 and 2, the PID12 function block 1022*b* is similar or identical to the PID1 function block 122*b* of FIGS. 1 and 2, the AI12 function block 1022*c* is similar or identical to the AI2 function block 122*c* of FIGS. 1 and 2, the PID13 function block 1022*d* is similar or identical to the PID2 function block 122*d* of FIGS. 1 and 2, and the AO11 function block 1022*e* is similar or identical to the AO1 function block 122*e* of FIGS. 1 and 2. For example, the block scan rates of the AI11 function block 1022*a* and the PID12 function block 1022*b* are equal to 2000 ms. Also, the block scan rates for the function blocks 1022*c-e* are equal to 500 ms. Although not shown, the connections between the function blocks 1022*a-e* are identical to the connections between the function blocks 122*a-e* shown in FIG. 2.

Another example quantity of start time offset table 1100 of FIG. 11 shows the quantity of start time offsets ($Q_s$) for each of the function blocks 1022*a-e* (FIG. 10) as determined based on their respective block scan rate factors ($F_{BSR}$), block raw execution periods ($T_{BRE}$), and rounded block raw execution periods ($RT_{BRE}$). The block raw execution period ($T_{BRE}$) for each of the function blocks 1022*a-e* is determined based on equation 1 above which, in turn, is based on the block scan rate factors ($F_{BSR}$) and the module execution period ($T_{ME}$) of the module 1020. Each of the block raw execution periods ($T_{BRE}$) is then rounded to determined the rounded block raw execution period ($RT_{BRE}$) for each of the function blocks 1022*a-e*.

The quantity of start time offsets ($Q_s$) for each of the function blocks 1022*a-e* is then determined based on equation 3 above. As shown in FIG. 11, reference numeral 1102 indicates the quantity of start time offsets ($Q_s$) equal to four for the AI12 function block 1022*c* (PDT11/FFAI12). To determine the quantity of start time offsets ($Q_s$) for the AI12 function block 1022*c*, the slowest rounded block raw execution period ($RT_{SRE}$) associated with the field device 1012*a* is first determined. In the illustrated example of FIG. 10, the field device 1012*a* is configured to execute the AI11 function block 1022*a*, the AI12 function block 1022*c*, and the AO11 function block 1022*e*. Therefore, the slowest rounded block raw execution period ($RT_{SRE}$) is the slowest of the rounded block raw execution period ($RT_{BRE}$) of the AI11 function block 1022*a*, the rounded block raw execution period ($RT_{BRE}$) of the AI12 function block 1022*c*, and the rounded block raw execution period ($RT_{BRE}$) of the AO11 function block 1022*e*. As shown in FIG. 11, the rounded block raw execution period ($RT_{BRE}$) of the AI11 function block 1022*a* (PDT11/FFAI11) is 2000 ms, the rounded block raw execution period ($RT_{BRE}$) of the AI12 function block 1022*c* (PDT11/FFAI12) is 500 ms, and the rounded block raw execution period ($RT_{BRE}$) of the AO11 function block 1022*c* (PDT11/FFAO11) is 500 ms. Accordingly, the slowest rounded block raw execution period ($RT_{SRE}$) associated with the field device 1012*a* is 2000 ms. In accordance with equation 3 above, to determine the quantity of start time offsets ($Q_s$) required by the AI12 function block 1022*c*, 2000 ms (the rounded block raw execution period ($RT_{BRE}$) of the AI12 function block 1022*c*) is divided by 500 ms (the slowest rounded block raw execution period ($RT_{SRE}$) associated with the field device 1012*a*) to calculate a value of four as indicated by reference number 1102.

The table 1100 also shows that the quantity of start time offsets ($Q_s$) required by the AI11 function block 1022*a* (PDT11/FFAI11) is equal to one as indicated by reference number 1104. In the illustrated example, the AI11 function block 1022*a* has one start time offset and the AI12 function block 1022*c* has four start time offsets because the rounded block raw execution period ($RT_{BRE}$) of the AI11 function block 1022*a* (2000 ms) is equal to the slowest rounded block raw execution period ($RT_{SRE}$) associated with the field device 1012*a* (2000 ms) while the rounded block raw execution period ($RT_{BRE}$) of the AI12 function block 1022*c* (500 ms) is four times smaller than the slowest rounded block raw execution period ($RT_{SRE}$) associated with the field device 1012*a* (2000 ms). Thus, the field device 1012*b* needs to execute the AI12 function block 1022*c* four times for each execution of the AI11 function block 1022*a*.

Figure 12:
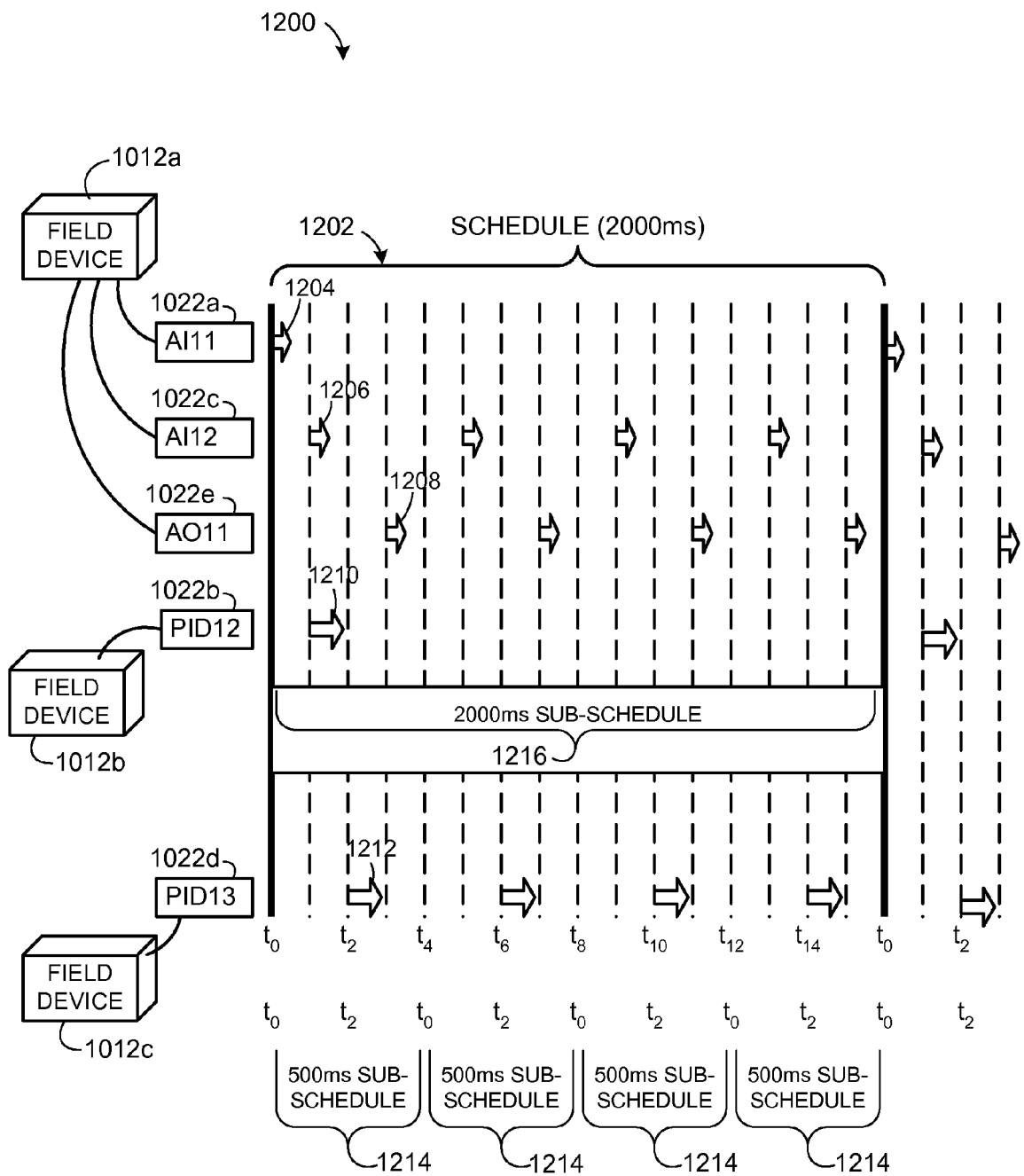
FIG. 12 is another example execution sequence diagram showing a schedule associated with the function blocks of FIG. 10 that is generated using the example methods and apparatus described herein.

FIG. 12 is another example execution sequence diagram 1200 showing a schedule 1202 (i.e., a function block execution schedule) and executions 1204, 1206, 1208, 1210, and 1212 of the respective function blocks 1022*a-e* (FIG. 10). The schedule 1202 is generated using a 500 ms sub-schedule 1214 associated with the PID2 function block 1022*d* and a 2000 ms sub-schedule 1216 associated with the function blocks 1022*a-c* and 1022*e*. As shown, the 500 ms sub-schedule 1214 is repeated four times during the schedule 1202 and the 2000 ms sub-schedule 1216 occurs one time during the schedule 1202.

In accordance with the table 1100 of FIG. 11, within the 2000 ms sub-schedule 1216, the AI11 function block 1022*a* has one start time offset (start time offset t0), the AI12 function block 1022*c* has four start time offsets (start time offsets t₁, t₅, t₉, and t₁₁), the AO11 function block 1022*e* has four start time offsets (start time offsets t₃, t₇, t₁₁, and t₁₅), and the PID12 function block 1022*b* has one start time offset (start time offset t₁). Also in accordance with the table 1100 of FIG. 11, within the 500 ms sub-schedule 1214, the PID13 function block 1022*d* has one start time offset (start time offset t₂).

The start time offsets of a function block can be determined in accordance with equation 4 below.

$$t_S = N_{Seq} \times T_{BRE} + t_{DA} \quad \text{Equation 4}$$

As shown above in equation 4, a start time offset ($t_S$) for a function block is determined by multiplying a sequence number ($N_{Seq}$) of a current start time offset to be calculated by the block raw execution period ($T_{BRE}$) for the function block and adding the resulting product to a data available time ($t_{DA}$) of the function block. The sequence number ($N_{Seq}$) refers to a particular execution instance of a function block during a sub-schedule (e.g., one of the sub-schedules 710 or 712 of FIG. 7). For example, in FIG. 12, the AI12 function module 1022*c* has four execution instances (i.e., a quantity of start time offsets ($Q_s$) equal to four and sequence numbers ($N_{seq}$) zero through three) during the 2000 ms sub-schedule 1216. The data available time ($t_{DA}$) of the function block refers to the time during a block raw execution period ($T_{BRE}$) of a function block when data required to execute the function block is made available by another function block. For example, the data available time ($t_{DA}$) of a first function block is determined based on when data from a second function block is available to a field device (e.g., when the data is published on the digital data bus 1014) that executes the first function block. If the first function block does not require data from the second function block or any other function block for a field device to execute the first function block, then the data available time ($t_{DA}$) of the first function block is set to zero. As a further example, if the block raw execution period ($T_{BRE}$) of a function block is 500 ms and data is made available to it by another function block at 125 ms relative to the start of the 500 ms block raw execution period ($T_{BRE}$), the data available time ($t_{DA}$) of the function block is 125 ms.

Referring to equation 4 and the AI12 function block 1022*c* executions 1206, the offset start times ($t_S$) t₁, t₅, t₉, and t₁₁ can be determined as follows. If the block raw execution period ($T_{BRE}$) of the AI12 function block 1022*c* is 500 ms the quantity of start time offsets ($Q_s$) is four (i.e., sequence numbers ($N_{seq}$) zero through three) during the 2000 ms sub-schedule 1216 as shown in FIG. 12 because the sub-schedule execution period of the 2000 ms sub-schedule 1216 divided by the 500 ms block raw execution period ($T_{BRE}$) of the AI12 function block 1022*c* is equal to four. Also, the data available time ($t_{DA}$) of the AI12 function block 1022*c* is 125 ms. Therefore, using equation 4 above, the start time offset ($t_S$) t₁ corresponding to the first sequence number ($N_{SEQ}$) is equal to 125 ms, the start time offset ($t_S$) t₅ corresponding to the second sequence number ($N_{SEQ}$) is equal to 625 ms, the start time offset ($t_S$) t₉ corresponding to the third sequence number ($N_{SEQ}$) is equal to 1125 ms, and the start time offset ($t_S$) t₁₁ corresponding the first sequence number ($N_{SEQ}$) is equal to 1625 ms.

Figure 13:
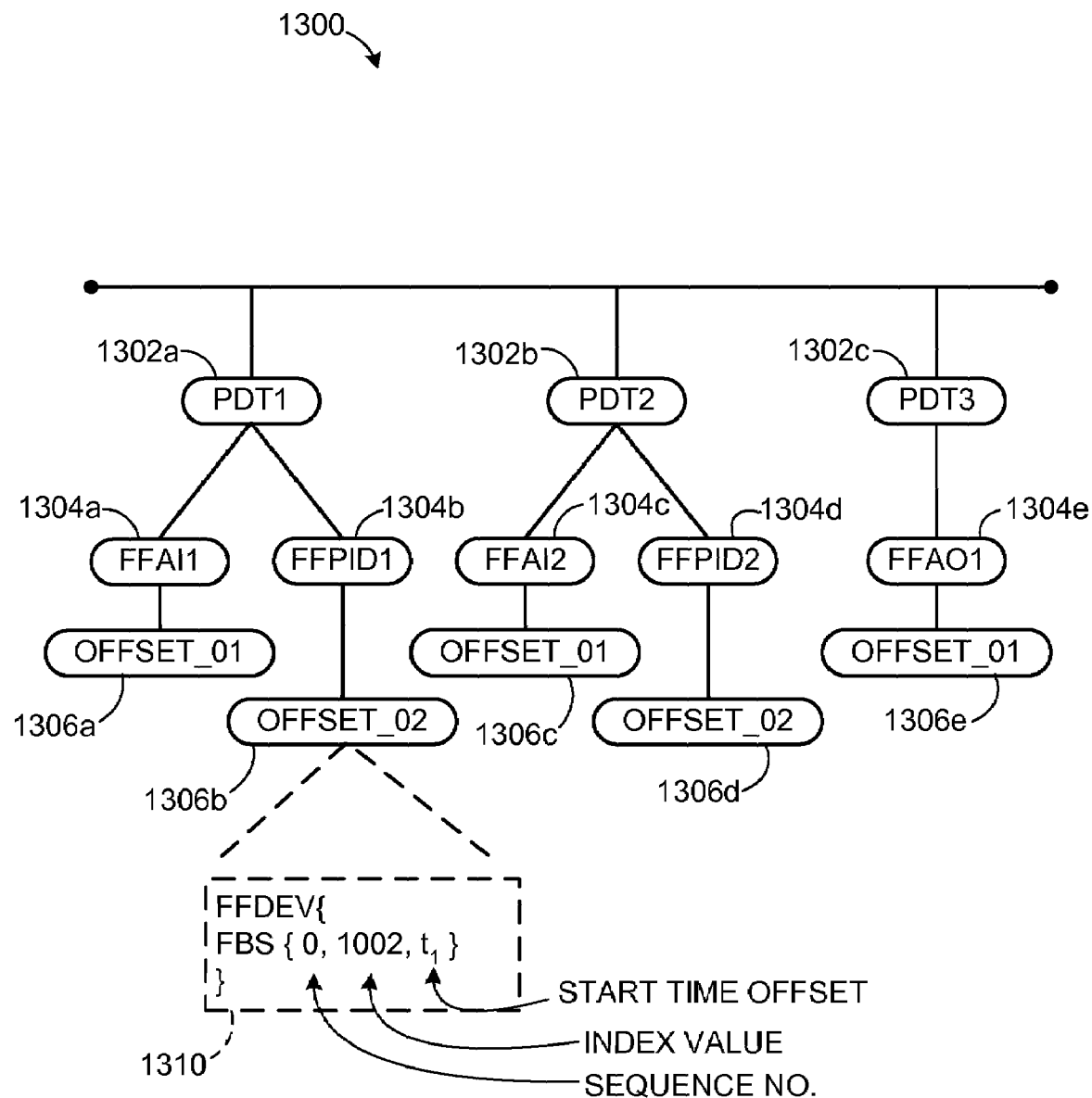
FIG. 13 is an example object-oriented software execution environment showing the relationships between objects representative of the field devices of FIG. 1, the function blocks of FIG. 1, and start time offsets corresponding to the function blocks.

FIG. 13 is an example object-oriented software execution environment 1300 showing the relationships between objects representative of the field devices 112*a-c* of FIG. 1, the function blocks 122*a-e* of FIG. 1, and start time offsets corresponding to the function blocks 122*a-e*. A PDT1 device object 1302*a* corresponding to the field device 112*a* of FIG. 1 is bound to an FFAI1 function object 1304*a* and an FFPID1 function object 1304*b*. The FFAI1 function object 1304*a* corresponds to the AI1 function block 122*a* of FIG. 1 and the FFPID1 function object 1304*b* corresponds to the PID1 function block 122*b* of FIG. 1. A PDT2 device object 1302*b* corresponding to the field device 112*b* of FIG. 1 is bound to an FFAI2 function block 1304*c* corresponding to the AI2 function block 122*b* (FIG. 1) and an FFPID2 function object 1304*d* corresponding to the PID2 function block 122*c* (FIG. 1). A PDT3 device object 1302*c* corresponding to the field device 112*c* of FIG. 1 is bound to an FFAO1 function block 1304*e* corresponding to the AO1 function block 122*e* (FIG. 1).

In accordance with the quantity of start time offsets table 900 of FIG. 9, each of the function objects 1304*a-e* has a respective one of a plurality of start time offsets 1306*a-e* shown in FIG. 13. Each of the start time offsets can be stored in a memory (e.g., a memory of the workstation 102 of FIG. 1) using a data structure. In the illustrated example of FIG. 13, an example start time offset data structure 1310 corresponding to the start time offset 1306 stores the start time offset 1306 in the format FBS {sequence number, index value, start time offset}. In the example, sequence number refers to a particular execution instance of a function block during a sub-schedule (e.g., one of the sub-schedules 710 or 712 of FIG. 7), the index value can be used to associate the start time offset with a respective function block, and start time offset refers to the start time offsets (e.g., the start time offset 1306*b*) of a respective function block.

Figure 14:
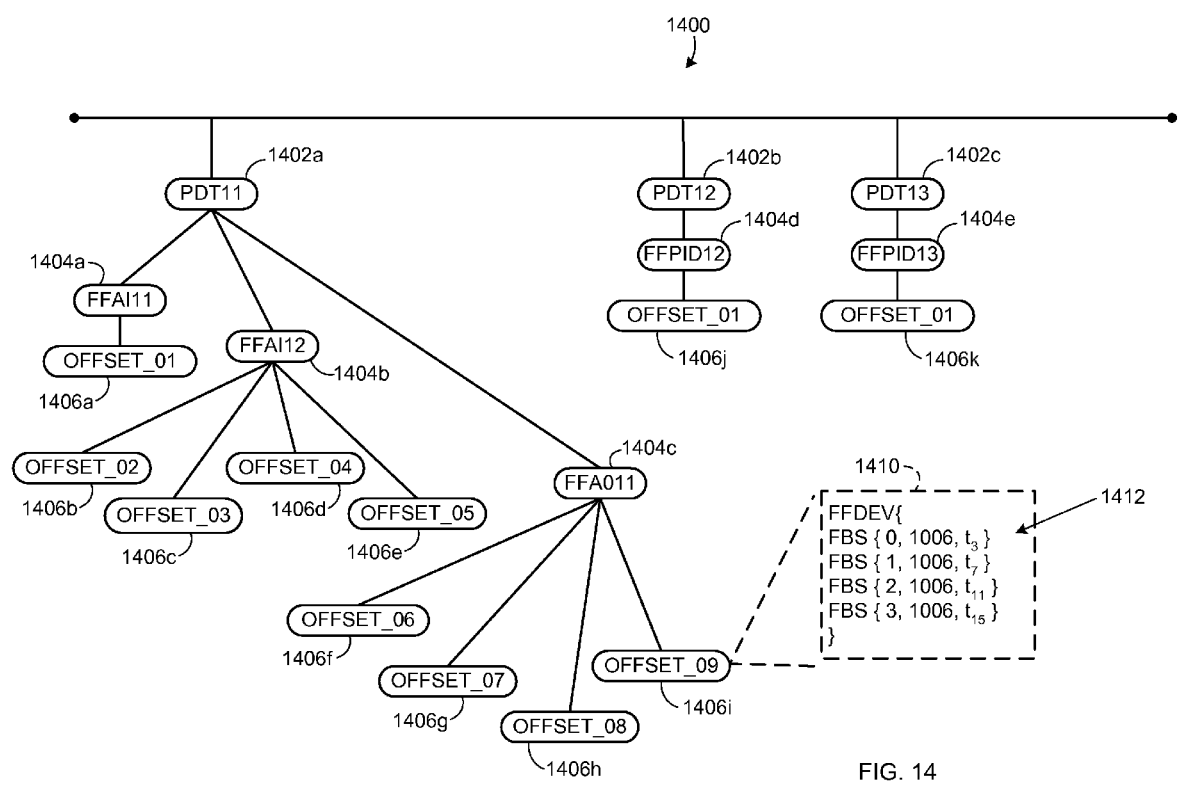
FIG. 14 is another example object-oriented software execution environment showing the relationships between objects representative of the field devices of FIG. 10, the function blocks of FIG. 10, and start time offsets corresponding to the function blocks.

FIG. 14 is another example object-oriented software execution environment 1400 showing the relationships between objects representative of the field devices 1012*a-c* of FIG. 10, the function blocks 1022*a-e* of FIG. 10, and start time offsets corresponding to the function blocks 1022*a-e*. A PDT11 device object 1402*a* corresponding to the field device 1012*a* of FIG. 10 is bound to an FFAI11 function block 1404*a* corresponding to the AI11 function block 1022*a* (FIG. 10), an FFAI12 function object 1404*b* corresponding to the AI2 function block 1022*c* (FIG. 1), and an FFAO11 function object 1404*c* corresponding to the AO11 function block 1022*e* of FIG. 10. A PDT12 device object 1402*b* corresponding to the field device 1012*b* of FIG. 10 is bound to an FFPID12 function block 1404*c* corresponding to the PID12 function block 1022*b* (FIG. 1). A PDT13 device object 1402*c* corresponding to the field device 1012*c* of FIG. 10 is bound to an FFPID13 function block 1404*d* corresponding to the PID13 function block 1022*d* (FIG. 1).

In accordance with the quantity of start time offsets table 1100 of FIG. 11, each of the function objects 1404*a-e* has one or more respective ones of a plurality of start time offsets 1406*a-k* shown in FIG. 14. An example start time offset data structure 1410 corresponding to the FFAO11 function object 1404*c* stores a start list 1412 having the start time offsets 1406*f-i*. Referring to the offset data structure 1410 and the example execution sequence diagram 1200 of FIG. 12, the start time offset 1406*f* is associated with a sequence number one and a start time offset of t₃, the start time offset 1406*g* is associated with a sequence number two and a start time offset of t₇, the start time offset 1406*h* is associated with a sequence number three and a start time offset of t₁₁, and the start time offset 1406*i* is associated with a sequence number four and a start time offset of t₁₅.

Figure 15:
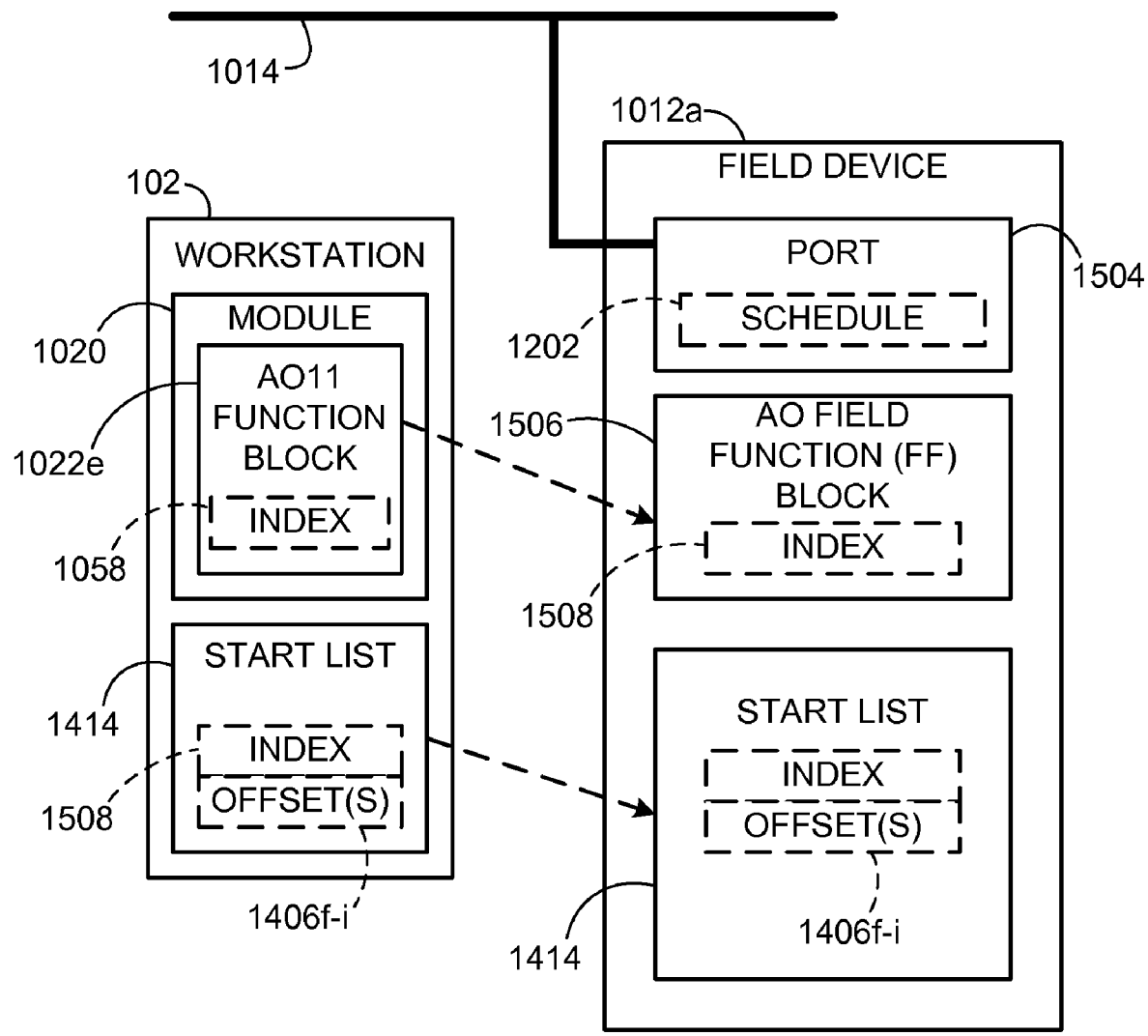
FIG. 15 illustrates an example manner in which a start list of FIG. 14 associated with a function block of FIG. 10 is copied from a workstation to a corresponding field device of FIG. 10.

FIG. 15 illustrates an example manner in which the start list 1412 (FIG. 14) associated with the AO11 function block 1022*e* (FIG. 10) is copied from the workstation 102 (FIG. 1) to the field device 1012*a* (FIG. 10). The workstation 102 downloads to the field devices 1012*a-c* start lists (e.g., the start list 1412) having start time offsets (e.g., the start time offsets 1406*f-i*) to enable the field devices 1012*a-c* to execute their respective functions corresponding to the function blocks 1022*a*-*e* (FIG. 10) at scheduled times during the schedule 1202 of FIG. 12. As shown in FIG. 15, the workstation 102 stores the module 1020 of FIG. 10, which includes the AO11 function block 1022*e*. Although not shown, the workstation 102 also stores the other function blocks 1022*a*-*d* FIG. 10. In the illustrated example, the workstation 102 stores the start list 1412 having the start time offsets 1406*f*-*i* of FIG. 8. Although not shown, the workstation 102 also stores the start lists corresponding to the function blocks 1022*a*-*d*.

Also shown in FIG. 15 is the field device 1012*a* of FIG. 10 having a port 1504 configured to communicatively couple the field device 1012*a* to the digital data bus 1014. The port 1504 is provided with the schedule 1202 (FIG. 12) associated with the digital data bus 1014. In particular, the schedule 1202 indicates to the port 1504 the duration of the schedule (e.g., 2000 ms) and the times at which all other field devices (e.g., the field devices 1012*a*-*c*) communicatively coupled to the digital data bus 1014 are configured to execute their respective functions (e.g., functions corresponding to the function blocks 1022*a*-*d* of FIG. 10).

In the illustrated example, the field device 1012*a* stores an AO function corresponding to the AO11 function block 1022*e* and designated as an AO field function (FF) block 1506. Of course, the field device 1012*a* can store more functions including, for example, an AI field function block corresponding to the AI11 function block 1022*a* shown in FIG. 10. The AO11 function block 1022*e*, the AO field function block 1506, and the start list 1414 store an index value 1508 that associates (e.g., keys) the AO11 function block 1022*e* and the AO field function block 1506 to the start time offsets 1406*f*-*i* in the start list 1414. After a schedule generation process in the workstation 102 or the controller 106 of FIG. 1 determines the start time offsets 1406*f*-*i* and stores the start time offsets 1406*f*-*i* in the start list 1414, the workstation 102 or the controller 106 communicates the start list 1414 having the start time offsets 1406*f*-*i* to the field device 1012*a* via the digital data bus 1014. As shown in FIG. 15, the field device 1012*a* then stores the start list 1414. The field device 1012*a* then uses the start time offsets 1406*f*-*i* to determine when to execute the AO field function block 1506 at the appropriate times in accordance with the schedule 1202. Although not shown, the field device 1012*a* also stores the start lists corresponding to the AI11 and AI12 function blocks 1022*a* and 1022*c* (FIG. 10).

Figure 16:
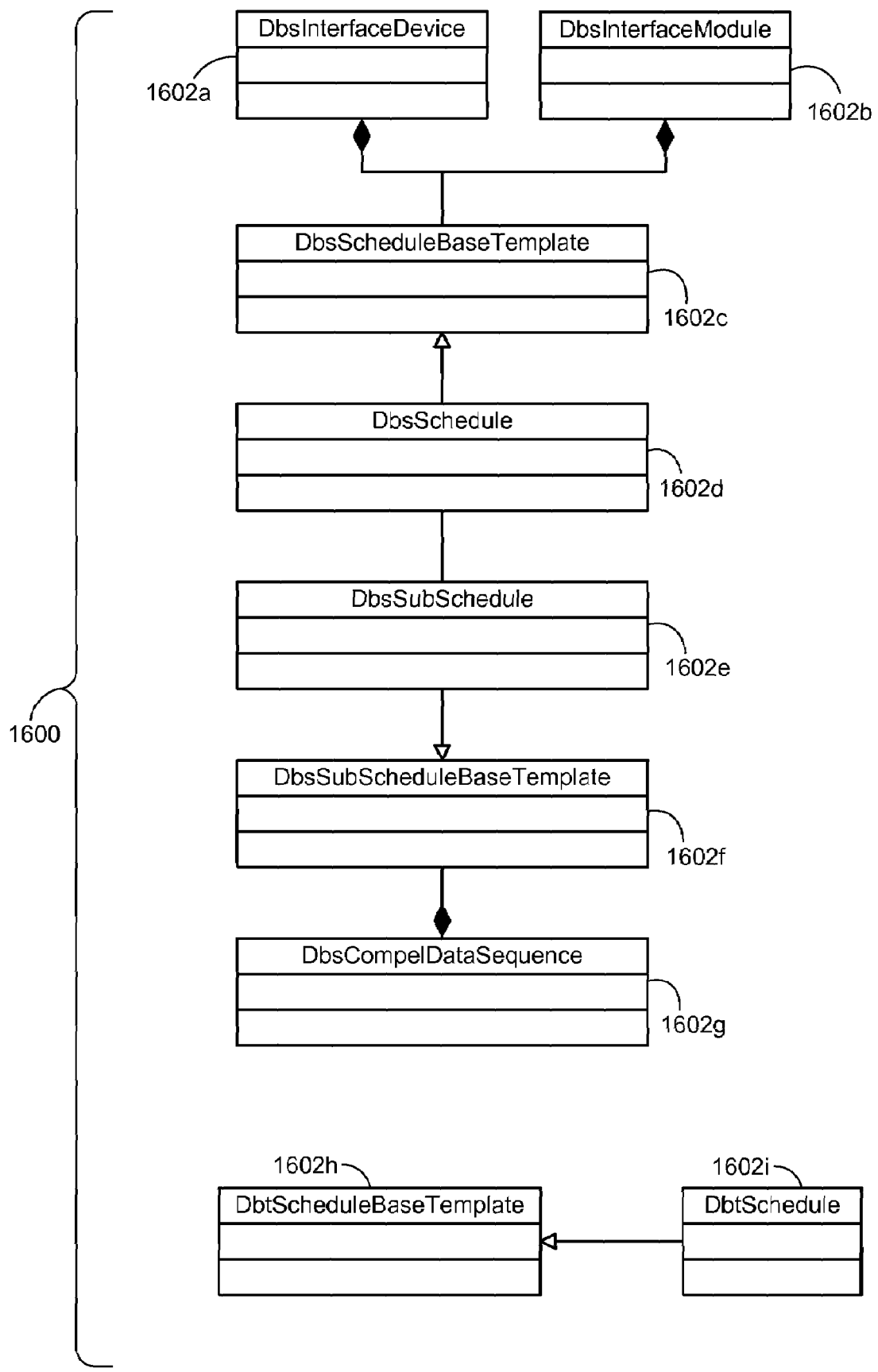
FIG. 16 depicts an example object-oriented programming environment having a plurality of classes 1602*a-i* configured to generate the schedules of FIGS. 7 and 12 using the example methods and apparatus described herein.

FIG. 16 depicts an example object-oriented programming environment 1600 having a plurality of classes 1602*a*-*i* configured to generate schedules (e.g., the schedules 702 and 1202 of FIGS. 7 and 12) using the example methods and apparatus described herein. A DbsInterfaceDevice class 1602*a* is provided to exchange information with field devices (e.g., the field devices 112*a*-*c* of FIG. 1 or the field devices 1012*a*-*c* of FIG. 10) or field device objects (e.g., the field device objects 1302*a*-*c* of FIG. 13 or the field device objects 1402*a*-*c* of FIG. 14). For example, the DbsInterfaceDevice class 1602*a* may be provided with a plurality of functions or methods configured to communicate with field devices or field device objects. An example function of the DbsInterfaceDevice class 1602*a* retrieves block scan rates or block raw execution periods ($T_{BRE}$) associated with each of the field devices 112*a*-*c* or 1012*a*-*c*.

A DbsInterfaceModule class 1602*b* is provided to exchange information with a module or module object (e.g., the module 120 of FIG. 1 or the module 1020 of FIG. 10) containing one or more field devices (e.g., the field devices 112*a*-*c* of FIG. 1 or the field devices 1012*a*-*c* of FIG. 10) for which to generate a schedule (e.g., the schedule 702 of FIG. 7 or the schedule 1202 of FIG. 12). An example function or method of the DbsInterfaceModule class 1602*b* may be configured to retrieve the execution order of function blocks (e.g., the function blocks 122*a*-*e* of FIGS. 1 and 2) from a module (e.g., the module 120 of FIG. 1) defined by interconnections of function blocks specified using a GUI control system design interface (e.g., the interconnections of the function blocks 122*a*-*e* shown in FIG. 2).

A DbsScheduleBaseTemplate class 1602*c* is provided to retrieve and/or generate base templates of schedules (e.g., a base template to generate the schedule 702 of FIG. 7 or a base template to generate the schedule 1202 of FIG. 12). The base templates of schedules provide the basic, or fundamental, framework required to generate schedules. For example, a base template of a schedule may include rules associated with scheduling function blocks and/or the base template may specify default parameters (e.g., schedule period, executions per schedule period, etc.). In some example implementations, a base template for a schedule may be retrieved from, for example, a schedule base template database (not shown) in the workstation 102.

A DbsSchedule class 1602*d* is provided to generate schedules (e.g., the schedule 702 of FIG. 7, the schedule 1202 of FIG. 12, or any other schedule) as described herein. A DbsSubSchedule class 1602*e* is provided to generate sub-schedules (e.g., the sub-schedules 710 and 712 of FIG. 7, the sub-schedules 1214 and 1216 of FIG. 12, or any other sub-schedules) as described herein. A DbsSubScheduleBaseTemplate class 1602*f* is provided to retrieve and/or generate base templates of sub-schedules (e.g., base templates to generate the sub-schedules 710 and 712 of FIG. 7 or base templates to generate the sub-schedules 1214 and 1216 of FIG. 12). The base templates of sub-schedules provide the basic, or fundamental, framework required to generate sub-schedules. In some example implementations, the base template for a sub-schedule may be retrieved from, for example, a sub-schedule base template database (not shown) in the workstation 102.

A DbsCompelDataSequence class 1602*g* may be provided to configure compel data sequences associated with schedules. A compel data sequence specifies when a field device (e.g., one of the field devices 112*a*-*c* of FIG. 1 or one of the field devices 1012*a*-*c* of FIG. 10) is to communicate or publish its data (e.g., measurement information, status information, etc.) to other field devices. In the illustrated example, the DbsCompelDataSequence class 1602*g* ensures that compel data commands are issued by a controller (e.g., the controller 106) to field devices following their execution of function blocks indicated in schedules (e.g., the schedules 710 and 1202 of FIGS. 7 and 12).

A DbtScheduleBaseTemplate class 1602*h* and a DbtSchedule class 1602*i* provide temporary workspace in which to generate a schedule (e.g., one of the schedules 702 or 1202 or any other schedule) during a generate schedule process and prior to publishing the schedule to field devices.

Figure 17:
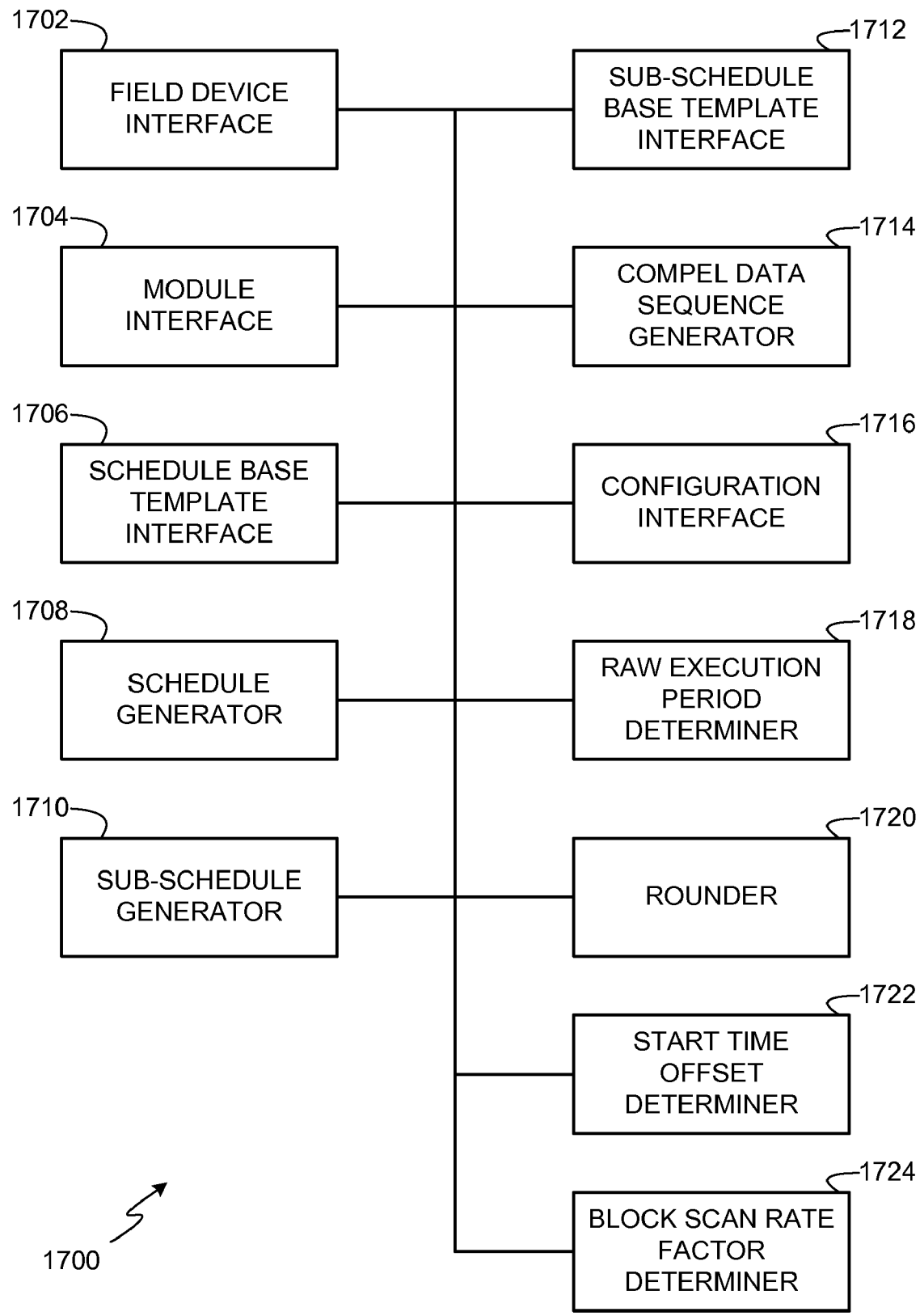
FIG. 17 is a detailed block diagram of an example apparatus that may be used to generate schedules in accordance with the example methods described herein.

FIG. 17 is a detailed block diagram of an example apparatus 1700 that may be used to generate schedules in accordance with the example methods described herein. The example apparatus 1700 may be implemented using the workstation 102 (FIG. 1), the controller 106 (FIG. 1), or any desired combination of hardware, firmware, and/or software. For example, one or more integrated circuits, discrete semiconductor components, or passive electronic components may be used. Additionally or alternatively, some or all of the blocks of the example apparatus 1700, or parts thereof, may be implemented using instructions, code, and/or other software and/or firmware, etc. stored on a machine accessible medium that, when executed by, for example, a processor system (e.g., the example processor system 2310 of FIG. 23), perform the operations represented in the flowcharts of FIGS. 18-21. In a software example implementation, the blocks of the example apparatus described below may be used to implement the object-oriented programming classes 1602a-g described above in connection with FIG. 16.

The example apparatus 1700 is provided with a field device interface 1702 configured to exchange information with field devices (e.g., the field devices 112a-c of FIG. 1 or the field devices 1012a-c of FIG. 10). For example, the field device interface 1702 may retrieve block scan rates or block raw execution periods ($T_{BRE}$) associated with each of the field devices 112a-c or 1012a-c.

The example apparatus 1700 is further provided with a module interface 1704 configured to exchange information with a module containing one or more field devices (e.g., the field devices 112a-c of FIG. 1 or the field devices 1012a-c of FIG. 10) for which to generate a schedule (e.g., the schedule 702 of FIG. 7 or the schedule 1202 of FIG. 12). For example, the module interface 1704 may be configured to retrieve the execution order of function blocks (e.g., the function blocks 122a-e of FIGS. 1 and 2) from a module (e.g., the module 120 of FIG. 1) defined by interconnections of function blocks specified using a GUI control system design interface (e.g., the interconnections of the function blocks 122a-e shown in FIG. 2).

The example apparatus 1700 is further provided with a schedule base template interface 1706 configured to retrieve and/or generate base templates of schedules (e.g., a base template to generate the schedule 702 of FIG. 7 or a base template to generate the schedule 1202 of FIG. 12). In an example implementation, the schedule base template interface 1706 retrieves base templates of schedules from a schedule base template database in the workstation 102 based on, for example, the quantity of and type of function blocks (e.g., the function blocks 122a-e of FIG. 1 and 1022a-e of FIG. 10) in a module (e.g., the module 120 of FIG. 1 or the module 1020 of FIG. 10).

The example apparatus 1700 is also provided with a schedule generator 1708 configured to generate schedules (e.g., the schedule 702 of FIG. 7, the schedule 1202 of FIG. 12, or any other schedule) as described herein. Additionally, the example apparatus 1700 is provided with a sub-schedule generator 1710 configured to generate sub-schedules (e.g., the sub-schedules 710 and 712 of FIG. 7, the sub-schedules 1214 and 1216 of FIG. 12, or any other sub-schedules) as described herein. To generate or retrieve base templates of sub-schedules, the example apparatus 1700 is provided with a sub-schedule base template interface 1712.

The example apparatus 1700 is further provided with a compel data sequence generator 1714 configured to generate compel data sequences associated with schedules. For example, when the schedule generator 1708 is finished generating a schedule (e.g., one of the schedules 702 (FIG. 7) or 1202 (FIG. 12)), the compel data sequence generator 1714 can generate a compel data sequence for the schedule to ensure that a controller (e.g., the controller 106 of FIG. 1) issues compel data commands to field devices following their executions of function blocks indicated in the schedule. In this manner data (e.g., measurement information, status information, calculation results, etc.) generated by field devices is communicated or published to other field devices requiring the data to perform other operations.

The example apparatus 1700 is additionally provided with a configuration interface 1716 that is configured to receive information, commands, etc. from a GUI design software application (e.g., the GUI design software application used to interconnect the function blocks 122a-e as shown in FIG. 2) used to design process control routings by adding, removing, and interconnecting function blocks (e.g., the function blocks 122a-e of FIGS. 1 and 2 and the function blocks 1022a-e of FIG. 12). For example, if a user changes an interconnection between two function blocks, the GUI design software application sends the configuration interface 1716 a notification of the change and information describing the change (e.g., output of function block A connected to input of function block B). In addition, the configuration interface 1716 is configured to access data structures or databases in the workstation 102 or in any other processor system coupled to the LAN 108 of FIG. 1 to retrieve process control system configuration information (e.g., digital data bus binding rules, limits of digital data bus, etc.).

The example apparatus 1700 is further provided with a raw execution period determiner 1718 to determine block raw execution periods ($T_{BRE}$) in accordance with equation 1 above. The example apparatus 1700 is also provided with a rounder 1720 to round block raw execution periods ($T_{BRE}$) in accordance with the rounding values shown in rounding table 800 of FIG. 8. In addition, the example apparatus 1700 is provided with a start time offset determiner 1722 configured to generate quantity of start time offsets ($Q_s$) and start time offset values ($t_S$) for function blocks. For example, the start time offset determiner 1721 can be configured to perform the calculations described above in connection with equations 3 and 4. Also, the example apparatus 1700 is provided with a block scan rate factor determiner 1724 to determine the block scan rate factors ($F_{BSR}$) of function blocks (e.g., the function blocks 122a-e of FIGS. 1 and 2 and the function blocks 1022a-e of FIG. 10). For example, the block scan rate factor determiner 1724 can determine a block scan rate factor ($F_{BSR}$) based on equation 2 above. To compare values, the example apparatus 1700 is provided with a comparator 1726. For example the comparator 1726 may be used to determine the slowest block raw execution period ($T_{SBE}$) associated with a field device by comparing the block raw execution periods ($T_{BRE}$) of the function blocks assigned to that device and determining which is the slowest.

FIGS. 18-21 are flowcharts of example methods that may be used to implement the example apparatus 1700 of FIG. 17. In some example implementations, the example methods of FIGS. 18-21 may be implemented using machine readable instructions comprising a program for execution by a processor (e.g., the processor 2312 shown in the example processor system 2310 of FIG. 23). The program may be embodied in software stored on a tangible medium such as a CD-ROM, a floppy disk, a hard drive, a digital versatile disk (DVD), or a memory associated with the processor 2312 and/or embodied in firmware and/or dedicated hardware in a well-known manner. Further, although the example program is described with reference to the flowcharts illustrated in FIGS. 18-21, persons of ordinary skill in the art will readily appreciate that many other methods of implementing the example apparatus 1700 of FIG. 17 may alternatively be used. For example, the order of execution of the blocks may be changed, and/or some of the blocks described may be changed, eliminated, or combined.

For purposes of discussion, the flow diagrams of FIGS. 18-21 are described below in connection with the schedule 1202 of FIG. 12. However, the example methods described in connection with the flow diagrams of FIGS. 18-21 may be used to generate any other schedule including, for example, the schedule 702 of FIG. 7.

Figure 18:
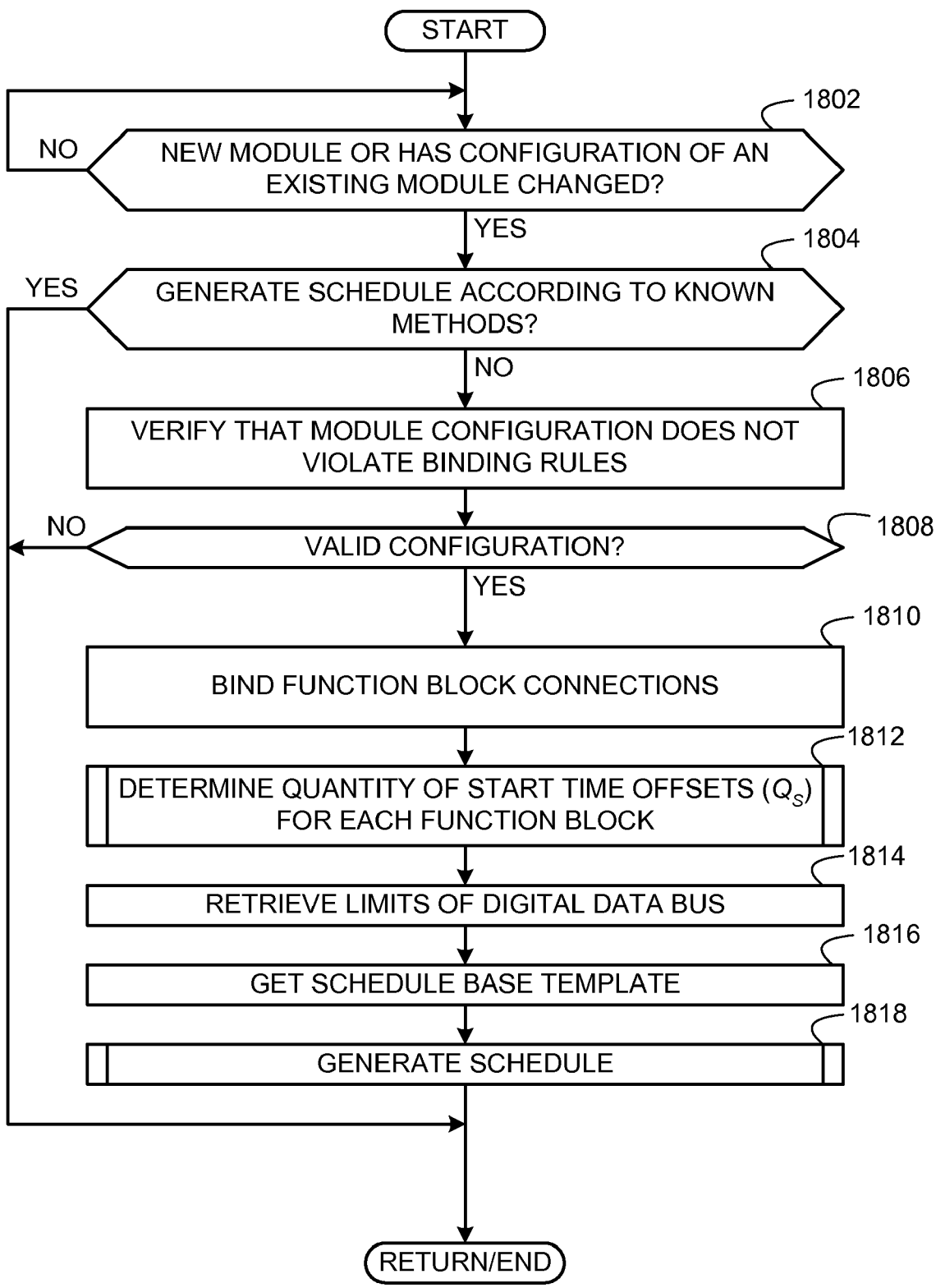
FIG. 18 is a flow diagram of an example method that may be used to implement the example apparatus of FIG. 17 to generate schedules as described herein.

Turning to FIG. 18, in an example method for generating schedules (e.g., the schedules 702 and 1202 of FIGS. 7 and 12 or any other schedule to schedule executions of function blocks within a process control system), the configuration interface 1716 determines if a new module (e.g., the module 1020 of FIG. 10) has been created or a configuration of an existing module has been changed (block 1802). If the configuration interface 1716 determines that a new module has not been added and that an existing module has not been changed, control remains at block 1802 until the configuration interface 1716 determines that a new module has been added or that an existing module has been changed.

If the configuration interface 1716 determines that a new module has been added or that the configuration of an existing module has been changed (block 1802), the configuration interface 1716 determines whether to generate a schedule according to known methods (block 1804). For example, the configuration interface 1716 may retrieve a schedule type descriptor from a data structure stored in the workstation 102 (FIG. 1). An example schedule generated in accordance with known methods is described above in connection with FIG. 6. If the configuration interface 1716 determines that known methods are to be used to generate a schedule, then the example method of FIG. 18 ends.

If the configuration interface 1716 determines that known methods are not to be used to generate a schedule, the configuration interface 1716 verifies that the module configuration does not violate any binding rules (block 1806). The binding rules indicate whether a particular module configuration is valid. For example, if one of the function blocks 1022a-e in the module 1020 of FIG. 10 is not assigned to one of the field device 1012a-c or any other field device, or if one of the function blocks 1022a-e is not properly connected, then the module 1020 is not valid for schedule generation. In the illustrated example, the configuration interface 1716 receives verification from a verification function in a process control system design software application that checks the module configuration against binding rules. If the configuration interface 1716 determines that the module configuration is not valid (block 1808), the example method of FIG. 18 ends.

If the configuration interface 1716 determines that the module configuration is valid (block 1808), the function block connections between the function blocks 1022a-e of FIG. 10 are bound to the digital data bus 1014 (FIG. 10) and to one another (block 1810). For example, the function block connections can be bound as described above in connection with FIG. 3. The example apparatus 1700 then determines the quantity of start time offsets ($Q_s$) for each of the function blocks 1022a-e (FIG. 10) (block 1812). The operation of block 1812 may be implemented using the example method described below in connection with FIG. 19.

After the example apparatus 1700 determines the quantity of start time offsets ($Q_s$), the configuration interface 1716 retrieves the limits of the digital data bus 1014 (block 1814). For example, the configuration interface 1716 can retrieve a time value defining the longest possible schedule that can run on the digital data bus 1014. The configuration interface 1716 can retrieve the limits from, for example, a digital data bus properties database in the workstation 102 or the controller 106. The schedule base template interface 1706 (FIG. 17) then retrieves a schedule base template (block 1816) from, for example, a schedule template database in the workstation 102. The example apparatus 1700 then generates the schedule 1202 (FIG. 12) (block 1818) as described in detail below in connection with the example method of FIG. 20. After the example apparatus 1700 generates the schedule 1202, control returns to a calling function or process and the example method of FIG. 18 is ended.

Figure 19:
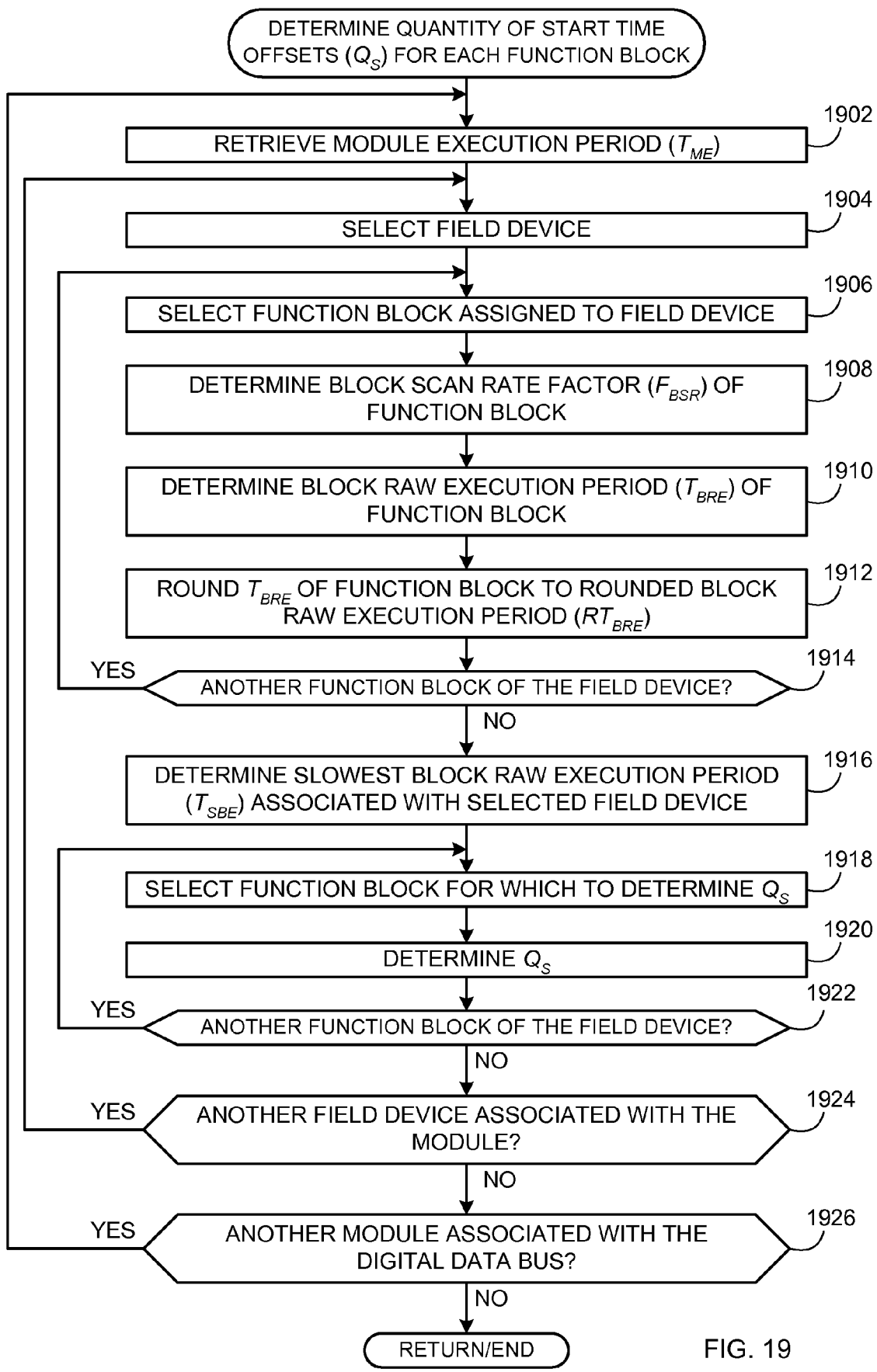
FIG. 19 is a flow diagram of an example method that may be implemented in connection with the example method of FIG. 18 to determine the quantity of start time offsets required by function blocks.

Turning to FIG. 19, the illustrated flow diagram depicts an example method that may be used to implement block 1812 of FIG. 18 to determine the quantity of start time offsets ($Q_s$) for each of the function blocks 1022a-e (FIG. 10). Initially, the module interface 1704 retrieves the module execution period ($T_{ME}$) of the module 1020 of FIG. 10 (block 1902). The module interface 1704 then selects a field device (block 1904) (e.g., one of the field devices 1022a-e) associated with the module 1020. For example, the module interface 1704 can determine which field devices (e.g., the field devices 1012a-c) the function blocks 1022a-e are assigned to and select one of those field devices by for example selecting a field device object (e.g., one of the field device objects 1402a-c of FIG. 14). For purposes of discussion, at block 1904, the module interface 1704 selects the field device 1012a of FIG. 10. In an object-oriented programming environment, the module interface 1704 selects the field device 1012a by selecting the field device object 1402a of FIG. 14.

The module interface 1704 then selects a function block (e.g., one of the function blocks 1022a, 1022c, or 1022e) assigned to the selected field device 1012a (block 1906). For purposes of discussion, the module interface 1704 selects the AI12 function block 1022c of FIG. 10 at block 1906. In an object-oriented programming environment, the module interface 1704 selects the AI12 function block 1022c by selecting the FFAI12 function block object 1404b of FIG. 14. The block scan rate factor determiner 1724 (FIG. 17) then determines the block scan rate factor ($F_{BSR}$) of the selected AI12 function block 1022c (block 1908). For example, the block scan rate factor determiner 1724 can obtain the module execution period ($T_{ME}$) of the module 1020 and the block scan rate factor (BSR) of the AI12 function block 1022c from the module interface 1704 and determine the block scan rate factor ($F_{BSR}$) of the AI12 function block 1022c using equation 2 above.

The raw execution period determiner 1718 (FIG. 17) then determines the block raw execution period ($T_{BRE}$) of the AI12 function block 1022c (block 1910). For example, the raw execution period determiner 1718 can use equation 1 above to determine the block raw execution period ($T_{BRE}$) of the AI12 function block 1022c based on the module execution period ($T_{ME}$) of the module 1020 and the block scan rate factor (BSR) of the AI12 function block 1022c. The rounder 1720 (FIG. 17) then rounds the block raw execution period ($T_{BRE}$) of the AI12 function block 1022c to a rounded block raw execution period ($RT_{BRE}$) (block 1912) based on the rounding table 800 of FIG. 8.

The module interface 1704 then determines whether the module 1020 contains another function block assigned to the selected field device 1012a (block 1914). If the module interface 1704 determines that the module 1020 contains another function block assigned to the selected field device 1012a (block 1914), then control is returned to block 1906 and the module interface 1704 selects the next function block (e.g., one of the function blocks 1022a and 1022e) assigned to the field device 1012a. Otherwise, if the module interface 1704 determines that the module 1020 does not contain another function block assigned to the selected field device 1012a (e.g., the rounded block raw execution periods ($RT_{BRE}$) have been determined for all of the function blocks 1022a, 1022c, and 1022e within the module 1020 assigned to the field device 1012a), the comparator 1726 then determines the slowest block raw execution period ($T_{SBE}$) associated with the selected field device (block 1916). For example, the comparator 1726 can compare the rounded block raw execution periods ($RT_{BRE}$) determined above in connection with blocks 1906, 1908, 1910, and 1912 of the function blocks 1022a, 1022c, and 1022e assigned to the field device 1012a. The comparator 1726 can then set the slowest block raw execution period ($T_{SBE}$) equal to the slowest one of the rounded block raw execution periods ($RT_{BRE}$) based on the comparison.

The module interface 1704 then selects a function block for which to determine a quantity of start time offsets ($Q_s$) (block 1918). For example, the module interface 1704 selects one of the function blocks 1022a, 1022c, and 1022e contained within the module 1020 and assigned to the selected field device 1012a. For purposes of discussion, the module 1020 selects the AI12 function block 1022c at block 1918. The start time offset determiner 1722 (FIG. 17) then determines the quantity of start time offsets ($Q_s$) for the AI12 function block 1022c (block 1920). For example, the start time offset determiner 1722 can use equation 3 above to determine the quantity of start time offsets ($Q_s$) based on the rounded block raw execution periods ($RT_{BRE}$) of the AI12 function block 1022c and the slowest block raw execution period ($T_{SBE}$) determined at block 1916.

The module interface 1704 then determines whether the module 1020 contains another function block assigned to the selected field device 1012a (block 1922). If the module interface 1704 determines that the module 1020 contains another function block assigned to the selected field device 1012a (block 1922), then control is returned to block 1918 and the module interface 1704 selects the next function block (e.g., one of the function blocks 1022a and 1022e) assigned to the field device 1012a. Otherwise, if the module interface 1704 determines that the module 1020 does not contain another function block assigned to the selected field device 1012a (e.g., the quantity of start time offsets ($Q_s$) have been determined for all of the function blocks 1022a, 1022c, and 1022e within the module 1020 assigned to the field device 1012a), the module interface 1704 determines if another field device (e.g., one of the field devices 1012b and 1012c of FIG. 10) is associated with the module 1020 (block 1924). For example, the module interface 1704 can determine that another field device is associated with the module 1020 if the module 1020 contains any function blocks (e.g., the function blocks 1022b and 1022d) that are assigned to other field devices (e.g., the field devices 1012b and 1012c) and for which quantity of start time offsets ($Q_s$) have not yet been determined.

If the module interface 1704 determines that another field device (e.g., one of the field devices 1012b and 1012c of FIG. 10) is associated with the module 1020 (block 1924), control is passed back to block 1904 at which point the module interface 1704 selects the next field device (e.g., one of the field devices 1012b and 1012c of FIG. 10). Otherwise, if the module interface 1704 determines that another field device is not associated with the module 1020 (block 1924), the module interface 1704 determines if another module (e.g., a module other than the module 1020) is associated with the digital data bus 1014 (block 1926). For example, another module associated with the digital data bus 1014 may contain function blocks assigned to ones of the field devices 1012a-c and the example apparatus 1700 then determines the quantity of start time offsets ($Q_s$) for those function blocks. If the module interface 1704 determines that another module is associated with the digital data bus 1014, control is returned to block 1902 at which point the module interface 1704 retrieves the module execution period ($T_{ME}$) of the next module. Otherwise, if the module interface 1704 determines that another module is not associated with the digital data bus 1014, control is returned to a calling function or process (e.g., the example method of FIG. 18) and the example method of FIG. 19 is ended.

Figure 20A:
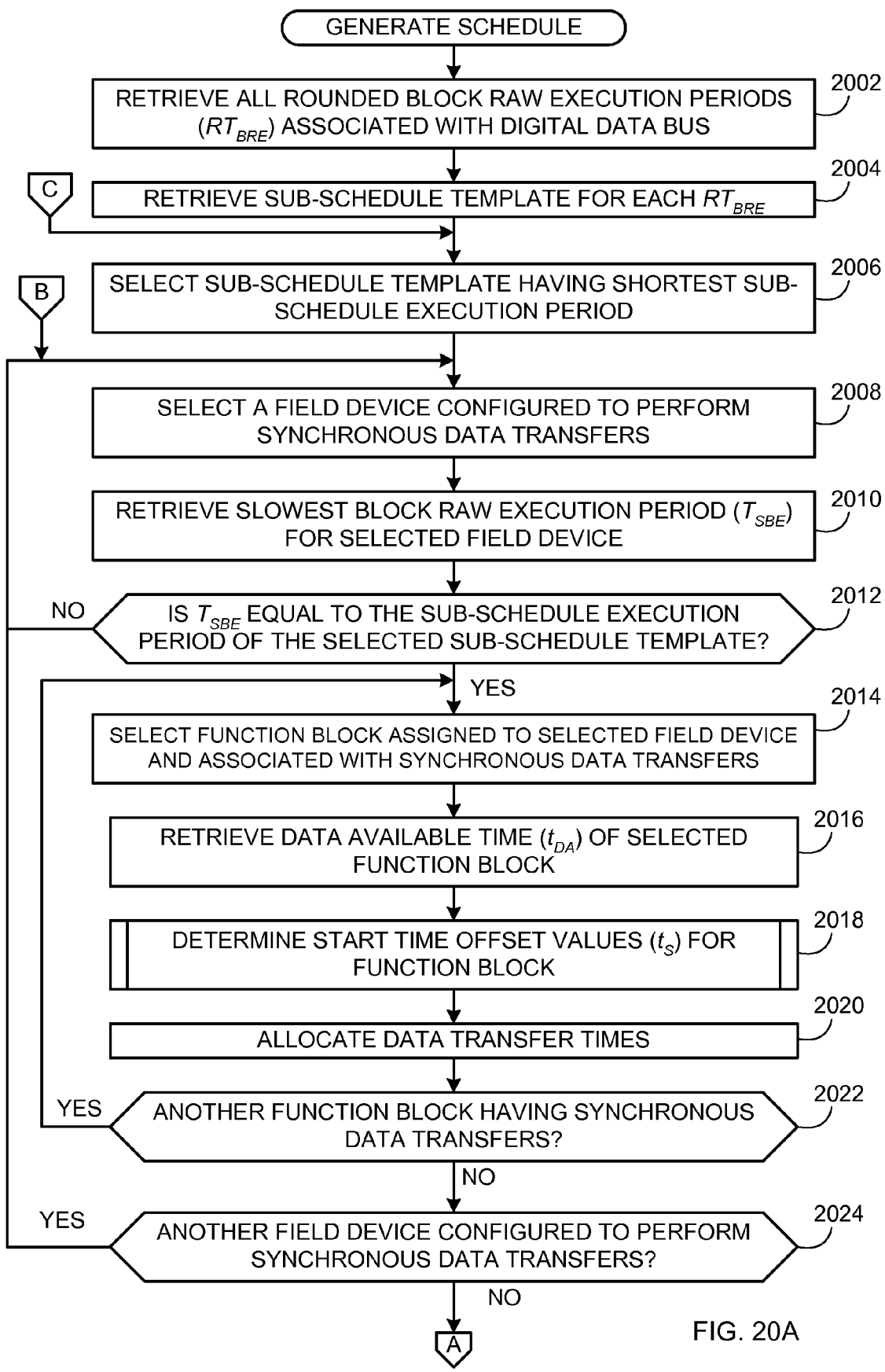
FIGS. 20A and 20B is a flow diagram of an example method that may be implemented in connection with the example method of FIG. 18 to generate sub-schedules and a schedule based on the generated sub-schedules.
Figure 20B:
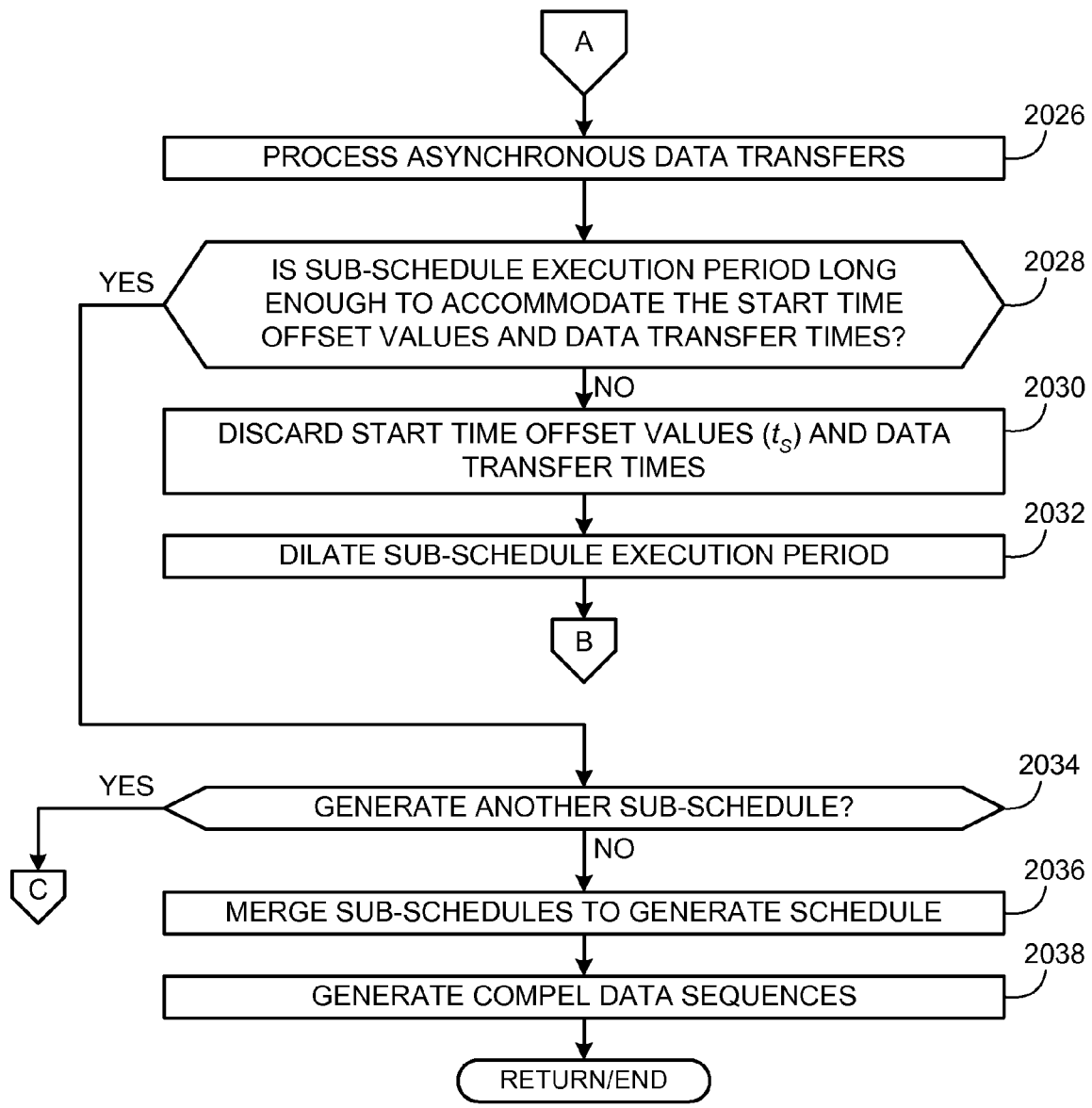

Turning to FIGS. 20A and 20B, the illustrated flow diagram depicts an example method that may be used to implement block 1818 of FIG. 18 to generate sub-schedules (e.g., the sub-schedules 1214 and 1216 of FIG. 12) and a schedule (e.g., the schedule 1202 of FIG. 12) based on the sub-schedules. Initially, the sub-schedule generator 1710 retrieves all of the rounded block raw execution periods ($RT_{BRE}$) associated with the digital data bus 1014 (block 2002). For example, sub-schedule generator 1710 retrieves all of the rounded block raw execution periods ($RT_{BRE}$) determined at block 1912 for all of the function blocks (e.g., the function blocks 1022a-e of FIG. 10) associated with the digital data bus 1014. The sub-schedule base template interface 1712 (FIG. 17) then retrieves sub-schedule base templates for each of the rounded block raw execution periods ($RT_{BRE}$) (block 2004). For example, the sub-schedule base template interface 1712 may retrieve the sub-schedule base templates from a sub-schedule base template database or data structure in the workstation 102 (FIG. 1). In the illustrated example, each of the sub-schedule base templates is configured to have a sub-schedule execution period equal to a respective one of the rounded block raw execution periods ($RT_{BRE}$) retrieved at block 2002. For example, as shown in FIG. 12, the sub-schedule execution period of the sub-schedule 1214 is equal to 500 ms and the sub-schedule execution period of the sub-schedule 1216 is equal to 2000 ms.

The sub-schedule generator 1710 selects the sub-schedule template having the shortest sub-schedule execution period (block 2006). For example, the sub-schedule generator 1710 may compare all of the sub-schedule execution periods to one another using the comparator 1726 (FIG. 17) to determine which one of the sub-schedule periods is the shortest. The sub-schedule generator 1710 then selects a field device configured to perform synchronous data transfers (block 2008). A field device (e.g., one of the field devices 1012a-c of FIG. 10) is configured to perform synchronous data transfers if it is assigned to execute a function block (e.g., one of the function blocks 1022a-e of FIG. 10) that transfers data in a synchronous manner. A function block transfers data in a synchronous manner if the data produced by that function block is required by another function block at a particular time. For example, if the PID13 function block 1022d (FIGS. 10 and 12) requires data from the AI12 function block 1022c (FIGS. 10 and 12) by time $t_2$ shown in FIG. 12, then the field device 1012a must perform a synchronous data transfer associated with the AI12 function block 1022c to ensure that the PID13 function block 1022d obtains the data by the time $t_2$. For purposes of discussion, the sub-schedule generator 1710 selects the field device 1012a (FIGS. 10 and 12).

The sub-schedule generator 1710 then retrieves the slowest block raw execution period ($T_{SBE}$) associated with the selected field device 1012a (block 2010). For example, the sub-schedule generator 1710 may retrieve the slowest block raw execution period ($T_{SBE}$) determined at block 1916 of FIG. 19 for the field device 1012a. The sub-schedule generator 110 then determines if the slowest block raw execution period ($T_{SBE}$) is equal to the sub-schedule execution period of the selected sub-schedule template (block 2012) using, for example, the comparator 1726 (FIG. 17). The sub-schedule to be generated using the sub-schedule template selected at block 2006 may include start time offsets ($t_S$) only for function blocks assigned to be executed by field devices associated with a slowest block raw execution period ($T_{SBE}$) equal to the sub-schedule execution period of the selected sub-schedule template. Therefore, if the sub-schedule generator 1710 determines that the slowest block raw execution period ($T_{SBE}$) of the field device 1012a selected at block 2008 is not equal to the sub-schedule execution period of the selected sub-schedule template (block 2012), the field device is skipped and control is returned to block 2008 at which point the sub-schedule generator 1710 selects another field device configured to perform synchronous data transfers.

Otherwise, if the sub-schedule generator 1710 determines that the slowest block raw execution period ($T_{SBE}$) of the field device 1012a selected at block 2008 is equal to the sub-schedule execution period of the selected sub-schedule template (block 2012), the sub-schedule generator 1710 selects a function block (e.g., one of the function blocks 1022a, 1022c, or 1022e) assigned to the selected field device 1012a and associated with synchronous data transfers (block 2014). For purposes of discussion, the sub-schedule generator 1710 selects the AI12 function block 1022c (FIGS. 10 and 12).

The sub-schedule generator 1710 then retrieves the data available time ($t_{DA}$) of the selected AI12 function block 1022c (block 2016). In the illustrated example, all data available times ($t_{DA}$) are predetermined by a synchronous data available time generator (not shown) and stored in a data structure in association with the input ports of the function block. For example, the synchronous data available time generator may scan all function blocks (e.g., the function blocks 1022a-e) prior to or during the schedule generation process of FIG. 18 to determine which function blocks require data transferred to them in a synchronous manner. The synchronous data available time generator can then pre-determine data available times ($t_{DA}$) to ensure that function blocks having to transfer data in a synchronous manner to other function blocks have sufficient time to execute and to transfer their data over the digital data bus 1014 so that function blocks requiring the data at a particular time can receive the data by that time. For a function block (e.g., the AI11 function block 1022a) that can be executed without requiring data from another function block, the data available time ($t_{DA}$) is set to zero because the function block can be executed as soon as a sub-schedule period begins.

The start time offset determiner 1722 (FIG. 17) determines the start time offset values ($t_S$) for the selected AI12 function block 1022c (block 2018) as described below in connection with FIG. 21. The sub-schedule generator 1710 then allocates data transfer times (block 2020) for the start time offset values ($t_S$) determined at block 2018. A data transfer time is the amount of time required to communicate data from one function block to another via the digital data bus 1014. A function block that transfers data to another function block within the same device does not have a data transfer time. However, a function block that transfers data to another function block within the same device does not have a data transfer time. Data transfer times occupy time on the digital data bus 1014 and are, thus, required to generate the sub-schedule to ensure the sub-schedule is sufficiently long enough to ensure that all function block executions and data transfers can occur on the digital data bus 1014.

The sub-schedule generator 1710 then determines if another function block assigned to the field device 1012a is associated with synchronous data transfers (block 2022). If the sub-schedule generator 1710 determines that another function block assigned to the field device 1012a is associated with synchronous data transfers (block 2022), then control returns to block 2014 at which point the sub-schedule generator 1710 selects the next function block associated with synchronous data transfers. Otherwise, the sub-schedule generator 1710 determines whether another field device communicatively coupled to the digital data bus 1014 is configured to perform synchronous data transfers (block 2024). If the sub-schedule generator 1710 determines that another field device communicatively coupled to the digital data bus 1014 is configured to perform synchronous data transfers (block 2024), control is returned to block 2008 at which point the sub-schedule generator 1710 selects another field device (e.g., one of the field devices 1012b and 1012c of FIGS. 10 and 12) configured to perform synchronous data transfers.

Otherwise, if the sub-schedule generator 1710 determines that another field device communicatively coupled to the digital data bus 1014 is not configured to perform synchronous data transfers (block 2024), the sub-schedule generator 1710 processes asynchronous data transfers (block 2026). For example, the sub-schedule generator 1710 can identify ones of the function blocks 1022a-e (FIGS. 10 and 12) that are associated with asynchronous data transfers, retrieve data available times ($t_{DA}$) for those function blocks in a manner similar to that described above in connection with block 2016, determine start time offset values ($t_S$) in a manner similar to that described below in connection with FIG. 21, and allocate data transfer times for those function blocks in a manner similar to that described above in connection with block 2020.

The sub-schedule generator 1710 then determines whether the sub-schedule execution period of the sub-schedule template selected at block 2006 is long enough to accommodate the start time offset values ($t_S$) and the data transfer times (block 2028) determined as described above. If the sub-schedule generator 1710 determines that the sub-schedule execution period of the sub-schedule template selected at block 2006 is not long enough to accommodate the start time offset values ($t_S$) and the data transfer times (block 2028), the sub-schedule generator 1710 discards the start time offset values ($t_S$) and the data transfer times (block 2030) to re-generate the sub-schedule. To provide the sub-schedule template selected at block 2006 with a long enough sub-schedule execution period to accommodate start time offset values ($t_S$) and the data transfer times of the function blocks to be generated for the sub-schedule template, the sub-schedule generator 1710 dilates the sub-schedule period of the sub-schedule template (block 2032). That is, the sub-schedule generator 1710 adds time to the sub-schedule execution period of the sub-schedule template to lengthen the sub-schedule execution period. For example, if the sub-schedule template used to generate the 2000 ms sub-schedule 1216 of FIG. 12 does not have a sub-schedule execution period long enough to accommodate the start time offsets ($t_S$) and the data transfer times associated with the function blocks 1022a-c and 1022e, the sub-schedule generator 1710 can add 500 ms to the sub-schedule template (or any other amount of time).

After the sub-schedule generator 1710 dilates the sub-schedule execution period of the selected sub-schedule template (block 2032), control returns to block 2008 at which point the operations of blocks 2008, 2010, 2012, 2014, 2016, 2018, 2020, 2022, 2024, 2026, and 2028 are repeated based on the dilated sub-schedule execution period. If the sub-schedule generator 1710 determines that the sub-schedule execution period of the sub-schedule template selected at block 2006 is long enough to accommodate the start time offset values ($t_S$) and the data transfer times (block 2028), the sub-schedule generator 1710 determines whether to generate another sub-schedule (block 2034). For example, if the example method of FIG. 18 is used to generate the schedule 1202 of FIG. 12 and sub-schedule generator 1710 has generated the sub-schedule 1214 but not the sub-schedule 1216, the sub-schedule generator 1710 determines that another sub-schedule (e.g., the sub-schedule 1216) should be generated. If the sub-schedule generator 1710 determines that another sub-schedule (e.g., the sub-schedule 1216) should be generated (block 2034), control is passed back to block 2006 (FIG. 20A) at which point the sub-schedule base template interface 1712 selects the next shortest sub-schedule execution period (e.g., the 2000 ms sub-schedule execution period corresponding to the 2000 ms sub-schedule 1216 of FIG. 12) (block 2006).

Otherwise, the schedule generator 1708 merges the sub-schedules (block 2036) (e.g., the sub-schedules 1214 and 1216 of FIG. 12) generated by the sub-schedule generator 1710 to generate a schedule (e.g., the schedule 1202 of FIG. 12). The compel data sequence generator 1714 then generates a compel data sequence for the schedule (block 2038). The compel data sequence ensures that the controller 106 communicates compel data commands to the field devices 1012a-c to cause the field devices 1012a-c to publish data on the digital data bus 1014 corresponding to their respective ones of the function blocks 1022a-e in accordance with the generated schedule. Control is then returned to a calling function or process (e.g., the example method of FIG. 18) and the example method of FIGS. 20A and 20B is ended.

Figure 21:
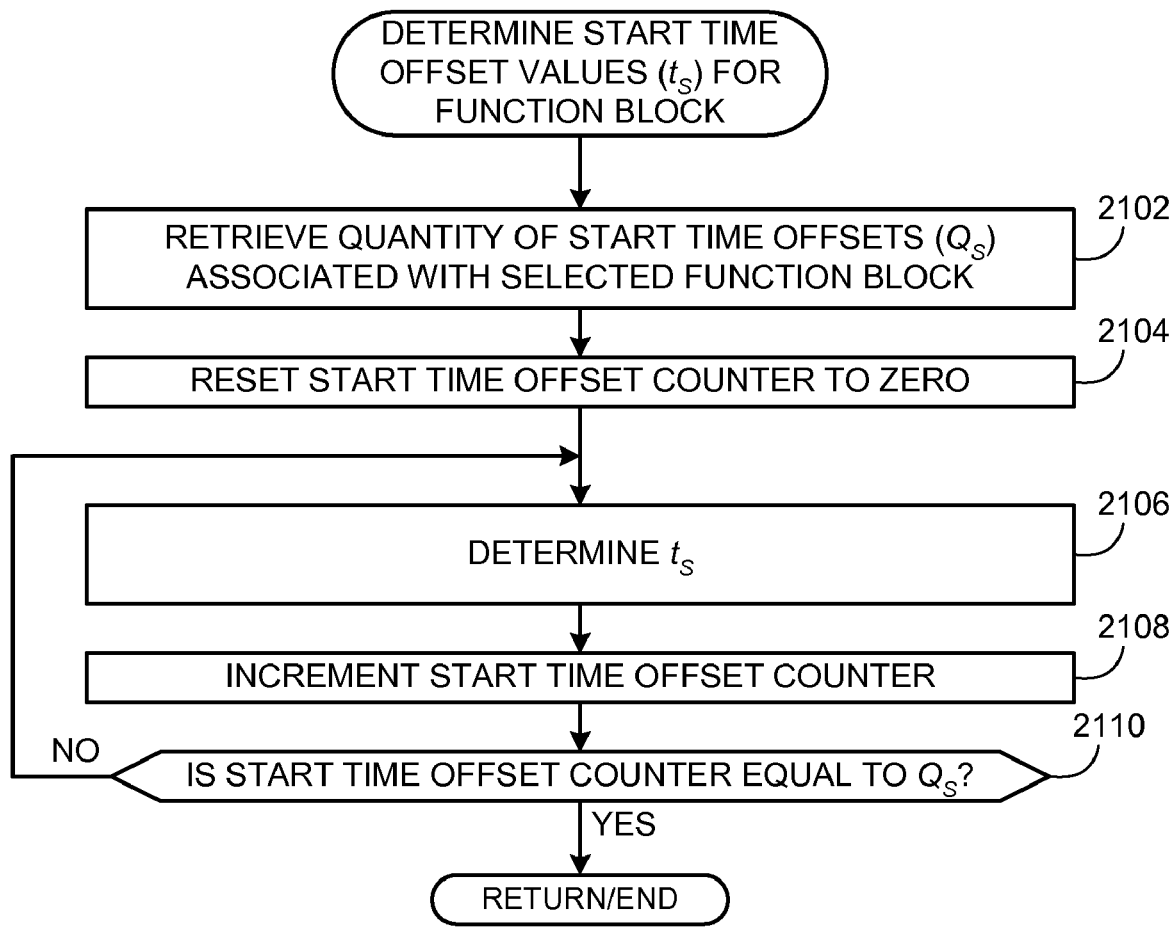
FIG. 21 is a flow diagram of an example method that may be implemented in connection with the example method of FIGS. 20A and 20B to determine start time offset values for a function block.

Turning to FIG. 21, the illustrated flow diagram depicts an example method that may be used to implement block 2018 of FIG. 20A to determine start time offset values ($t_S$) for a function block. In the illustrated example, the example method of FIG. 21 uses equation 4 above to determine the start time offset values ($t_S$). Initially, the start time offset determiner 1722 (FIG. 17) retrieves the quantity of start time offsets ($Q_s$) associated with a selected function block (block 2102) (e.g., a function block selected at block 2014 of FIG. 20A). For purposes of discussion, the AI12 function block 1022c (FIGS. 10 and 12) is the selected function block. Accordingly, the quantity of start time offsets ($Q_s$) retrieved at block 2102 is four. In the illustrated example, the quantity of start time offsets ($Q_s$) (e.g., four) is determined at block 1812 of FIG. 18 for the selected AI12 function block 1022c. The start time offset determiner 1722 then resets a start time offset counter to zero (block 2104). The value of the start time offset counter is used to provide the sequence number ($N_{Seq}$) of equation 4 above. In addition, the value of the start time offset counter is used to determine when all of the start time offset values ($t_S$) for the selected function block have been determined.

The start time offset determiner 1722 determines a first start time offset value ($t_S$) (block 2106). For example, the start time offset determiner 1722 uses equation 4 above to determine the start time offset value ($t_S$) of the AI12 function block 1022c indicated in FIG. 12 as $t_1$ based on the value of the start time offset counter (e.g., the sequence number ($N_{Seq}$) of the current start time offset (sequence zero, sequence one, sequence two, etc.)), the slowest block raw execution period ($T_{SBE}$) associated with the field device (e.g., the field device 1012a) assigned to execute the AI12 function block 1022c, and the data available time ($t_{DA}$) obtained at block 2016 for the AI12 function block 1022c.

The start time offset determiner 1722 then increments the value of the start time offset counter (block 2108) and determines whether the start time offset counter is equal to the quantity of start time offsets ($Q_s$) (block 2110) retrieved at block 2102. If the start time offset determiner 1722 determines that the start time offset counter is not equal to the quantity of start time offsets ($Q_s$), control returns to block 2106 at which point the start time offset determiner 1722 determines a next start time offset value ($t_S$) (e.g., the start time offset value ($t_S$) of the AI12 function block 1022c indicated in FIG. 12 as $t_5$. Otherwise, control is returned to a calling function or process (e.g., the example method of FIGS. 20A and 20B) and the example method of FIG. 21 is ended.

Figure 22:
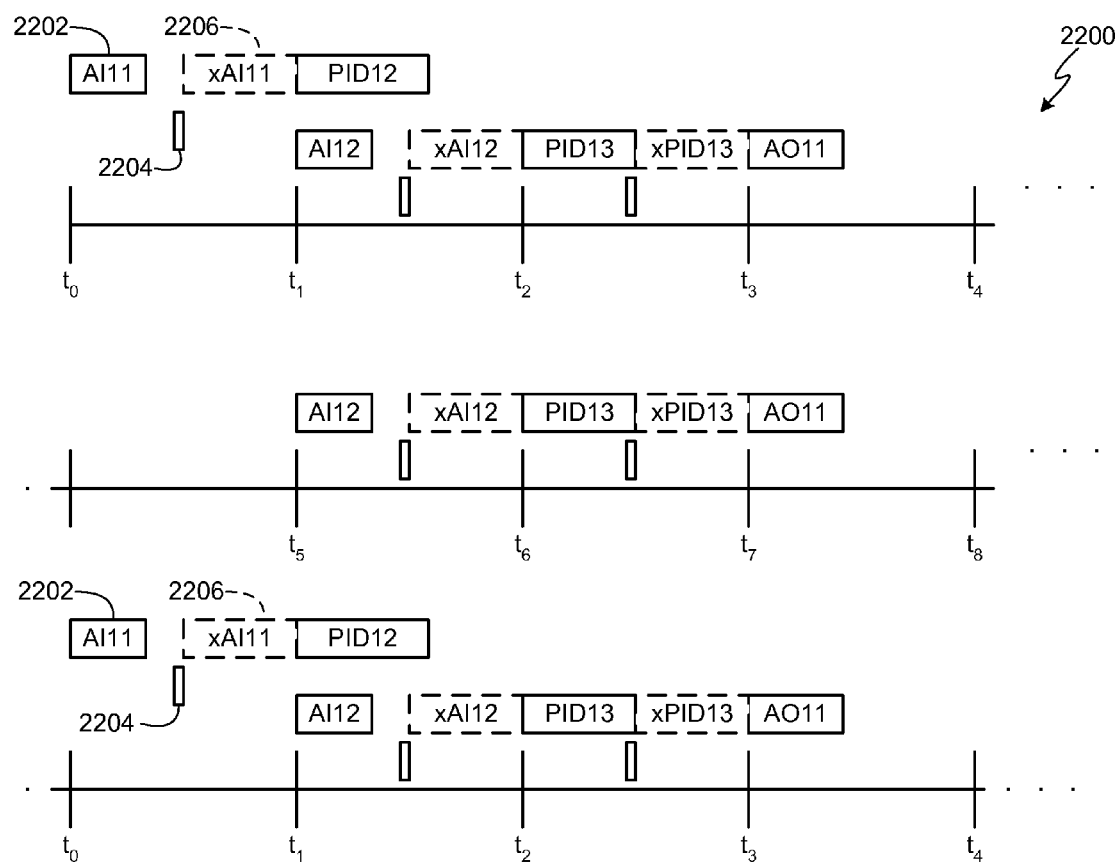
FIG. 22 is an example function execution and data transfer sequence diagram of the schedule of FIG. 12.

FIG. 22 is an example function execution and data transfer sequence diagram 2200 of the schedule 1202 of FIG. 12. The example function execution and data transfer sequence diagram 2200 shows the relationship between executions of the function blocks 1022a-e and data transfer time required to transfer data from one function block to another via the digital data bus 1014. The example function execution and data transfer sequence diagram also shows when compel data commands are issued by the controller 106 to cause the field devices 1012a-c of FIG. 12 to publish data on the digital data bus 1014. For example, as shown in FIG. 22, after an AI11 function block execution 2202 a compel data command 2204 causes the field device 1012a to perform an AI11 data transfer 2206 to enable a PID12 execution 2208. Other function block executions, compel data commands, and corresponding data transfers are also shown. Although not shown, if two function blocks are executed by the same field device, no data transfer times (e.g., the AI11 data transfer 2206) associated with the digital data bus 1014 are necessary to exchange data between the function blocks because the data transfers occur within the same field device.

Figure 23:
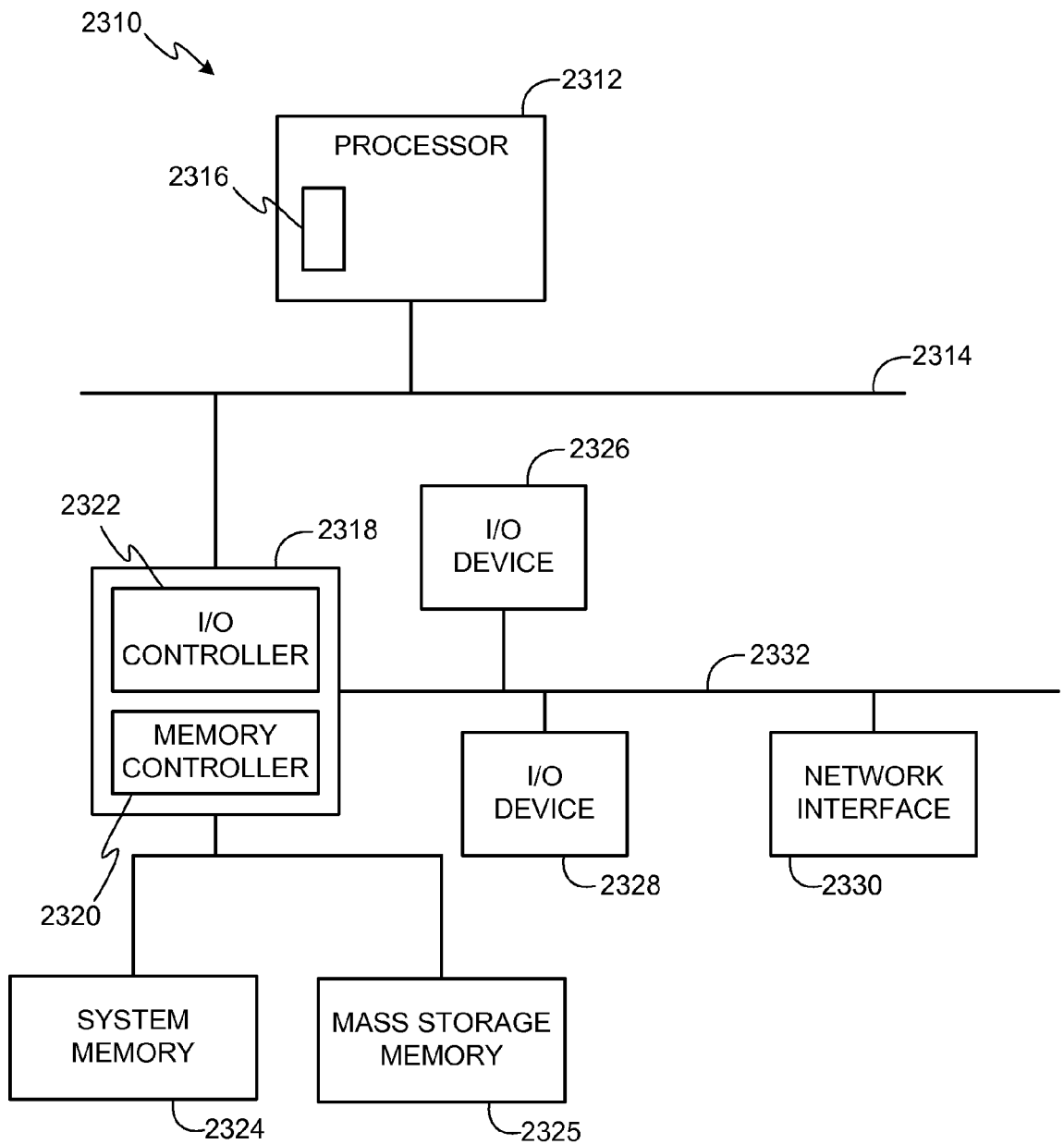
FIG. 23 is a block diagram of an example processor system that may be used to implement the example systems and methods described herein.

FIG. 23 is a block diagram of an example processor system 2310 that may be used to implement the apparatus and methods described herein. As shown in FIG. 23, the processor system 2310 includes a processor 2312 that is coupled to an interconnection bus 2314. The processor 2312 includes a register set or register space 2316, which is depicted in FIG. 23 as being entirely on-chip, but which could alternatively be located entirely or partially off-chip and directly coupled to the processor 2312 via dedicated electrical connections and/or via the interconnection bus 2314. The processor 2312 may be any suitable processor, processing unit or microprocessor. Although not shown in FIG. 23, the system 2310 may be a multi-processor system and, thus, may include one or more additional processors that are identical or similar to the processor 2312 and that are communicatively coupled to the interconnection bus 2314.

The processor 2312 of FIG. 23 is coupled to a chipset 2318, which includes a memory controller 2320 and a peripheral input/output (I/O) controller 2322. As is well known, a chipset typically provides I/O and memory management functions as well as a plurality of general purpose and/or special purpose registers, timers, etc. that are accessible or used by one or more processors coupled to the chipset 2318. The memory controller 2320 performs functions that enable the processor 2312 (or processors if there are multiple processors) to access a system memory 2324 and a mass storage memory 2325.

The system memory 2324 may include any desired type of volatile and/or non-volatile memory such as, for example, static random access memory (SRAM), dynamic random access memory (DRAM), flash memory, read-only memory (ROM), etc. The mass storage memory 2325 may include any desired type of mass storage device including hard disk drives, optical drives, tape storage devices, etc.

The peripheral I/O controller 2322 performs functions that enable the processor 2312 to communicate with peripheral input/output (I/O) devices 2326 and 2328 and a network interface 2330 via a peripheral I/O bus 2332. The I/O devices 2326 and 2328 may be any desired type of I/O device such as, for example, a keyboard, a video display or monitor, a mouse, etc. The network interface 2330 may be, for example, an Ethernet device, an asynchronous transfer mode (ATM) device, an 802.11 device, a DSL modem, a cable modem, a cellular modem, etc. that enables the processor system 2310 to communicate with another processor system.

While the memory controller 2320 and the I/O controller 2322 are depicted in FIG. 23 as separate functional blocks within the chipset 2318, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the appended claims either literally or under the doctrine of equivalents.

What is claimed is:

1. An apparatus to generate a schedule to execute functions in a process control system, the apparatus comprising:
a processor apparatus, comprising:
a first interface configured to identify a first function to be performed by a first field device communicatively coupled to a process controller via a data bus and a second function to be performed by a second field device communicatively coupled to the process controller via the data bus, wherein the first field device communicates first information associated with the first function via the data bus based on a first data communication time period, and wherein the second field device communicates second information associated with the second function via the data bus based on a second data communication time period;
a sub-schedule generator configured to generate a first sub-schedule associated with a first sub-schedule time period, wherein the first sub-schedule indicates a first execution time at which the first function is to be performed;
a schedule generator configured to form a schedule associated with a schedule time period based on two instances of the first sub-schedule and based on the first data communication time period being less than the second data communication time period, wherein the schedule indicates the first execution time and a second execution time at which the first function is to be performed; and a start time offset determiner configured to determine a quantity of start time offsets indicating a quantity of times that the first function is to be performed during the first sub-schedule, the quantity of start time offsets based on a slowest function block execution period associated with the first field device configured to perform the first function and a function block execution period of the first function.

2. An apparatus as defined in claim 1, wherein the sub-schedule generator is configured to generate a second sub-schedule associated with the second function having a second sub-schedule time period longer than the first sub-schedule time period and shorter or equal to the schedule time period, wherein the second sub-schedule indicates a third execution time at which the second function is to be performed.

3. An apparatus as defined in claim 2, wherein the schedule generator is further configured to generate the schedule based on one instance of the second sub-schedule, wherein the schedule indicates that the first function is to be performed twice during the schedule and the second function is to be performed once during the schedule.

4. An apparatus as defined in claim 2, wherein the first function is associated with a first process loop and the second function is associated with a second process loop, and wherein the first process loop is configured to execute using a shorter loop execution period than a loop execution period of the second process loop.

5. An apparatus as defined in claim 2, wherein the first function is configured to be performed by the first field device to measure a pressure and the second function is configured to be performed by the second field device to measure a temperature.

6. An apparatus as defined in claim 1, wherein the processor apparatus further comprises a raw execution period determiner to determine a length of time between the first execution time and the second execution time of the first function, wherein the first and second execution times are consecutive start times at which the first function is performed at two consecutive instances, and wherein the sub-schedule generator is configured to select the first sub-schedule time period based on the length of time between the first and second execution times.

7. An apparatus as defined in claim 1, wherein the schedule associated with the schedule time period based on two instances of the first sub-schedule comprises the first sub-schedule occurring twice during the schedule time period, and wherein the first occurrence of the first sub-schedule includes the first execution time at which the first function is to be performed and the second occurrence of the first sub-schedule includes the second execution time at which the first function is to be performed.

8. An apparatus as defined in claim 7, wherein the first and second occurrences of the first sub-schedule occur during a single occurrence of a second sub-schedule associated with the second data communication time period, and wherein the second function is performed once during the second sub-schedule.

9. An apparatus as defined in claim 1, wherein the first data communication time period being less than the second data communication time period comprises the first data communication time period having a first duration, the second data communication time period having a second duration, and the first duration being shorter than the second duration.

10. A machine accessible medium having instructions stored thereon that, when executed, cause a machine to:
generate a first quantity of start time offsets indicating a quantity of executions of a first function during a first sub-schedule associated with a first time period, wherein the first function is to be performed by a first field device communicatively coupled to a process controller via a data bus and a second function is to be performed by a second field device communicatively coupled to the process controller via the data bus, wherein the first field device communicates first information associated with the first function via the data bus based on a first data communication time period, wherein the second field device communicates second information associated with the second function via the data bus based on a second data communication time period, and wherein the first quantity of start time offsets are generated based on a slowest function block execution period associated with the first field device configured to perform the first function and a function block execution period of the first function
generate a second quantity of start time offsets indicating a quantity of executions of the second function during the first sub-schedule, wherein the first quantity of start time offsets is different from the second quantity of start time offsets; and
generate a schedule associated with a schedule time period based on two instances of the first sub-schedule and based on the first data communication time period being less than the second data communication time period.

11. A machine accessible medium as defined in claim 9, having instructions stored thereon that, when executed, cause the machine to determine the slowest function block execution period associated with the first field device by comparing the function block execution period of the first function with a second function block execution period of a third function, wherein the first and third functions are to be performed by the first field device.

12. A machine accessible medium as defined in claim 10, having instructions stored thereon that, when executed, cause the machine to determine a plurality of start time offset values indicating a plurality of execution times at which the first function is to be performed during the first sub-schedule.

13. A machine accessible medium as defined in claim 12, having instructions stored thereon that, when executed, cause the machine to determine the plurality of start time offset values based on the function block execution period of the first function and the first quantity of start time offsets.

14. A method to generate a schedule to execute functions in a process control system, the method comprising:

generating a first quantity of start time offsets indicating a quantity of executions of a first function during a first sub-schedule associated with a first time period, wherein the first function is to be performed by a first field device communicatively coupled to a process controller via a data bus and a second function is to be performed by a second field device communicatively coupled to the process controller via the data bus, wherein the first field device communicates first information associated with the first function via the data bus based on a first data communication time period, wherein the second field device communicates second information associated with the second function via the data bus based on a second data communication time period, and wherein the first quantity of start time offsets are generated based on a slowest function block execution period associated with the first field device configured to perform the first function and a function block execution period of the first function generating a second quantity of start time offsets indicating a quantity of executions of the second function during the first sub-schedule, wherein the first quantity of start time offsets is different from the second quantity of start time offsets; and generating, via a processor, a schedule associated with a schedule time period based on two instances of the first sub-schedule and based on the first data communication time period being less than the second data communication time period.

15. A method as defined in claim 14, wherein the first function is associated with a first process loop and the second function is associated with a second process loop, and wherein the first process loop is configured to execute using a shorter loop execution period than a loop execution period of the second process loop.

16. A method as defined in claim 14, wherein determining the slowest function block execution period associated with the first field device comprises comparing the function block execution period of the first function with a second function block execution period of a third function, wherein the first and third functions are to be performed by the first field device.

17. A method as defined in claim 14, further comprising determining a plurality of start time offset values indicating a plurality of execution times at which the first function is to be performed during the first sub-schedule.

18. A method as defined in claim 17, wherein determining the plurality of start time offset values comprises determining the plurality of start time offset values based on the function block execution period of the first function and the first quantity of start time offsets.

19. A method as defined in claim 14, further comprising generating the schedule based on at least one instance of a second sub-schedule, wherein the schedule indicates that a third function is to be performed once during the schedule and the first and second functions are to be performed a plurality of times during the schedule.

\* \* \* \* \*